(12) United States Patent
Wagstaff et al.

(10) Patent No.: US 8,899,186 B2
(45) Date of Patent: Dec. 2, 2014

(54) ORAL CARE DEVICES, METHODS, AND COMPOSITIONS

(71) Applicant: Orabrush, Inc., Provo, UT (US)

(72) Inventors: Robert K. Wagstaff, Springville, UT (US); Shekhar Mitra, Cincinnati, OH (US)

(73) Assignee: Orabrush, Inc., Orem, UT (US)

( * ) Notice: Subject to any disclaimer, the term of this patent is extended or adjusted under 35 U.S.C. 154(b) by 0 days.

(21) Appl. No.: 13/799,292

(22) Filed: Mar. 13, 2013

(65) Prior Publication Data

US 2013/0255590 A1   Oct. 3, 2013

Related U.S. Application Data

(60) Provisional application No. 61/736,271, filed on Dec. 12, 2012, provisional application No. 61/617,885, filed on Mar. 30, 2012.

(51) Int. Cl.
| | |
|---|---|
| *A01K 13/00* | (2006.01) |
| *A61D 5/00* | (2006.01) |
| *A46B 15/00* | (2006.01) |
| *A46B 11/00* | (2006.01) |

(52) U.S. Cl.
CPC ............ *A01K 13/001* (2013.01); *A61D 5/00* (2013.01); *A01K 13/003* (2013.01); *A46B 15/0081* (2013.01); *A46B 11/0027* (2013.01); *A46B 2200/1086* (2013.01)
USPC .......................................... 119/664; 119/652

(58) Field of Classification Search
USPC .............. 119/51.03, 602, 603, 650, 652, 664; 15/104.94, 110, 111, 160, 167.1, 15/186–88; 606/161; 433/1; 132/105, 111, 132/112, 114, 120, 121, 313; 434/263
See application file for complete search history.

(56) References Cited

U.S. PATENT DOCUMENTS

| 408,926 A * | 8/1889 | Palmer .............................. 433/1 |
| 888,138 A | 5/1908 | Bell |

(Continued)

FOREIGN PATENT DOCUMENTS

| AU | B-30182/97 | 4/1998 |
| WO | WO03077706 | 9/2003 |

(Continued)

OTHER PUBLICATIONS

"Toothbrush," GreatBigStuff.com, available to http://www.greatbigstuff.com/products/toothbrush.*

(Continued)

*Primary Examiner* — Rob Swiatek
*Assistant Examiner* — Lisa Tsang
(74) *Attorney, Agent, or Firm* — Brian Tucker; Kirton McConkie

(57) ABSTRACT

Oral care devices (including cleaning devices and delivery devices), oral care compositions, and related methods for using such devices and compositions are disclosed herein. A cleaning device may include a plurality of bristles and a plurality of tongue scrapers. A delivery device may include a delivery surface that is configured to retain an oral care composition. The oral care composition may include an incentivizing agent to entice an animal to lick the disclosed cleaning and/or delivery devices and may be in the form of a foam, liquid spray, gel or paste. The oral care composition may be dispensed onto a surface of a cleaning and/or delivery device. The device and composition may then be presented to an animal. The animal may lick the surface of the device. The licking action of the animal in licking the oral care device may clean the oral cavity and/or deliver an oral care composition.

18 Claims, 27 Drawing Sheets

FIG. 12A

(56) References Cited

U.S. PATENT DOCUMENTS

| | | | |
|---|---|---|---|
| 1,142,698 A | 6/1915 | Grove et al. | |
| 2,583,750 A * | 1/1952 | Runnels | 606/161 |
| 3,230,562 A | 1/1966 | Birch | |
| 4,022,879 A | 5/1977 | Dietrich | |
| D332,352 S | 1/1993 | Caldwell et al. | |
| 5,226,197 A | 7/1993 | Nack et al. | |
| 5,365,881 A * | 11/1994 | Sporn | 119/633 |
| 5,511,273 A | 4/1996 | Carroll | |
| 5,930,860 A | 8/1999 | Shipp | |
| 6,032,315 A | 3/2000 | Liebel | |
| 6,083,235 A | 7/2000 | Wagner | |
| 6,257,172 B1 * | 7/2001 | Leppanen | 119/605 |
| 6,582,224 B1 | 6/2003 | Lilien et al. | |
| 6,746,681 B1 | 6/2004 | Carroll | |
| 6,792,642 B2 | 9/2004 | Wagstaff | |
| 6,966,094 B1 * | 11/2005 | Rigakos | 15/111 |
| 7,047,589 B2 | 5/2006 | Gavney, Jr. | |
| 7,051,394 B2 | 5/2006 | Gavney, Jr. | |
| 7,480,955 B2 * | 1/2009 | Hohlbein et al. | 15/111 |
| 7,614,111 B2 * | 11/2009 | Moskovich et al. | 15/167.1 |
| 7,931,913 B2 | 4/2011 | Mythen | |
| 8,282,298 B2 | 10/2012 | Robinson et al. | |
| 2002/0078902 A1 * | 6/2002 | Ehrmann | 119/625 |
| 2003/0074754 A1 * | 4/2003 | Holden | 15/160 |
| 2003/0163149 A1 | 8/2003 | Heisinger, Jr. | |
| 2003/0211053 A1 | 11/2003 | Szeles et al. | |
| 2004/0177462 A1 * | 9/2004 | Brown et al. | 15/167.1 |
| 2004/0255967 A1 * | 12/2004 | White et al. | 132/120 |
| 2006/0047292 A1 * | 3/2006 | Reed | 606/161 |
| 2006/0052805 A1 | 3/2006 | Cwik | |
| 2006/0086048 A1 | 4/2006 | Romley | |
| 2007/0015100 A1 * | 1/2007 | Morris | 433/1 |
| 2008/0147104 A1 * | 6/2008 | Gatzemeyer et al. | 606/161 |
| 2008/0181716 A1 * | 7/2008 | Gatzemeyer et al. | 401/270 |
| 2009/0070947 A1 * | 3/2009 | Baertschi et al. | 15/22.1 |
| 2011/0094528 A1 * | 4/2011 | Leung | 132/120 |
| 2011/0214240 A1 | 9/2011 | Jimenez | |
| 2012/0180806 A1 | 7/2012 | Wagstaff | |

FOREIGN PATENT DOCUMENTS

| | | |
|---|---|---|
| WO | WO2009/102939 | 8/2009 |
| WO | 2011008958 A1 | 1/2011 |

OTHER PUBLICATIONS

Piccard Meds 4 Pets, All Dogs Dental Kit Finger Toothbrush & Toothpaste, http://piccardmeds4pets.com/Dog-Dental-Kit-Triple-Toothbrush-Toothpaste-Save-P1012227.aspx, Nov. 7, 2012.

Radio Systems Corporation, Lickety Stik, http://www.petsafe.net/products/pet-treats/lickety-stik, © 2012, Dec. 7, 2012.

TropiClean, Mint Foam, Gentle Foamer, Instant Fresh Breath, http://www.tropiclean.net/products/mint-foam.php, Feb. 2, 2012, 1 Pg.

Danser et al. "Tongue coating and tongue brushing: a literature review," International Journal of Dental Hygiene 1:151-158, 2003.

Office Action Summary for U.S. Appl. No. 13/349,456 from USPTO mailed Apr. 25, 2013.

* cited by examiner

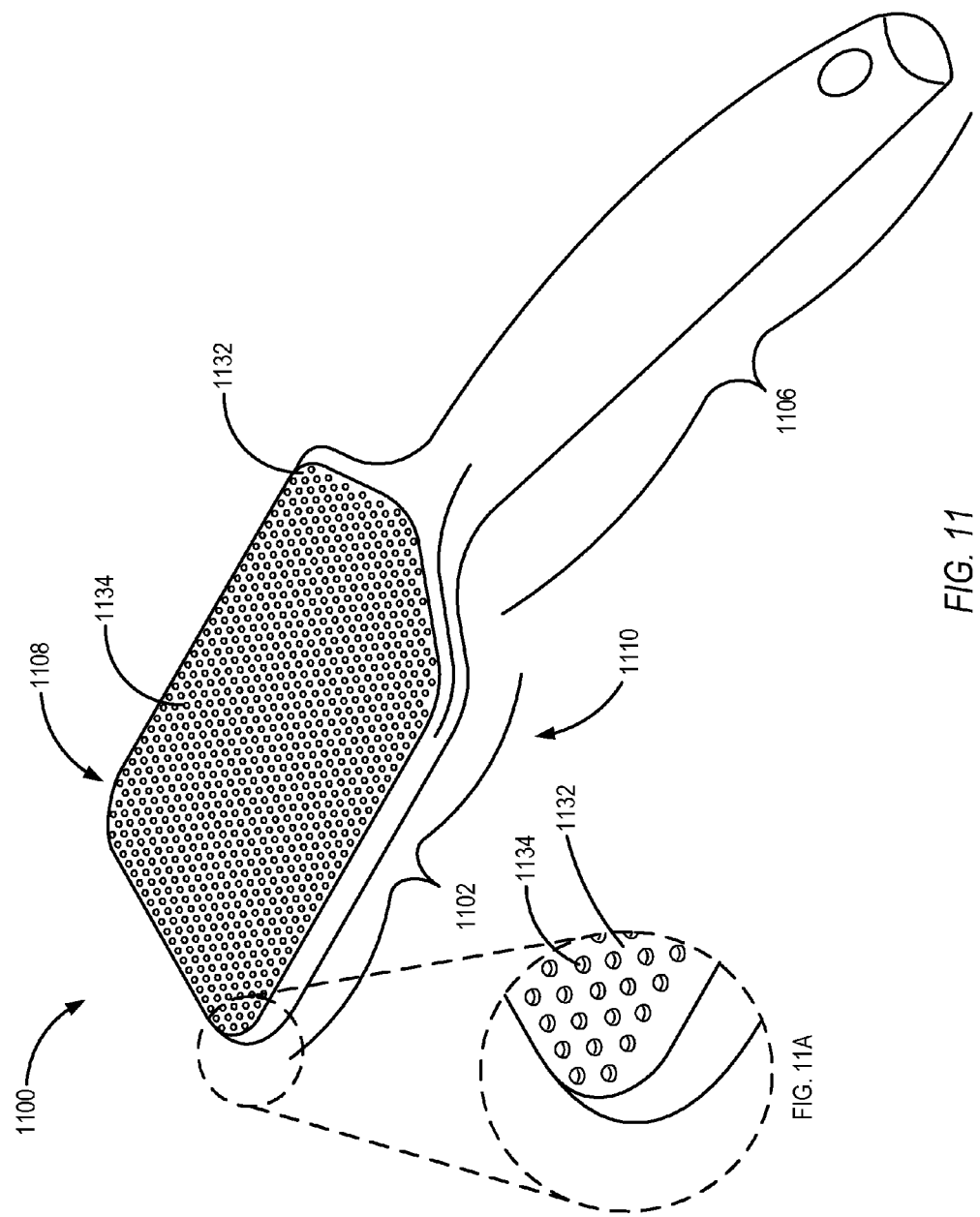

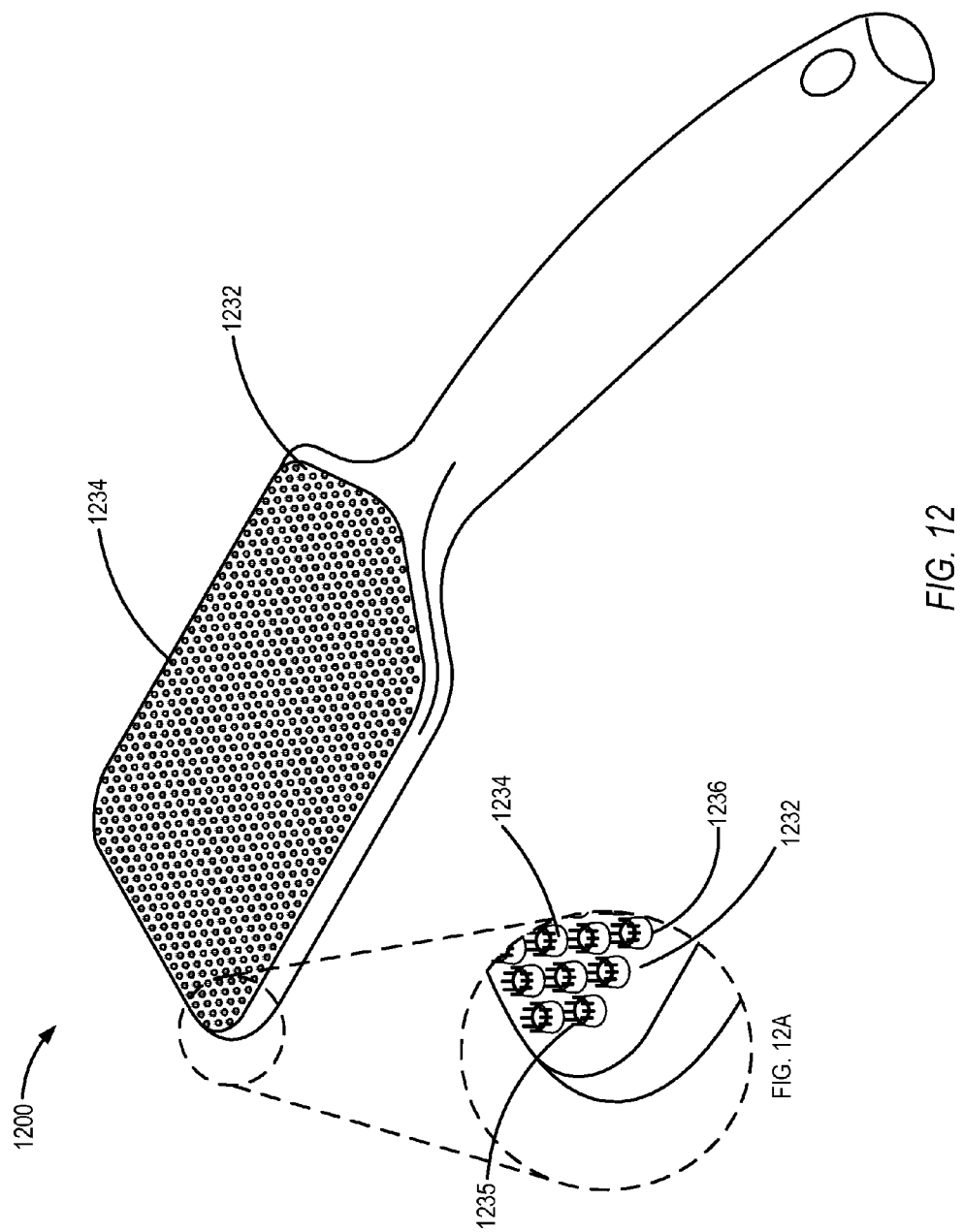

ORAL CARE DEVICES, METHODS, AND COMPOSITIONS

RELATED APPLICATIONS

The present application claims benefit of priority under 35 U.S.C. §119(e) of U.S. Provisional Patent Application No. 61/736,271, filed Dec. 12, 2012, and entitled "ORAL CARE DEVICES, METHODS, AND COMPOSITIONS," and U.S. Provisional Application No. 61/617,885, filed Mar. 30, 2012, and entitled "DEVICES, METHODS, AND COMPOSITIONS FOR CLEANING THE TONGUE OF AN ANIMAL," each of which is hereby incorporated herein by reference in its entirety.

TECHNICAL FIELD

The present disclosure is generally directed to oral care devices, methods, and compositions.

BRIEF DESCRIPTION OF THE DRAWINGS

The embodiments disclosed herein will become more fully apparent from the following description and appended examples, taken in conjunction with the accompanying drawings. These drawings depict only typical embodiments, which will be described with additional specificity and detail through use of the accompanying drawings in which:

FIG. 11 is a perspective view of an oral care device in the form of an oral delivery device, according to one embodiment of the present disclosure.

FIG. 11A is a close-up view of a of the oral delivery device of FIG. 11.

FIG. 12 is a perspective view of an oral delivery device, according to one embodiment of the present disclosure.

FIG. 12A is a close-up view of a delivery surface of the oral delivery device of FIG. 12.

FIG. 14A is a close-up view of a portion of the oral care system of FIG. 14.

FIG. 16A is a close-up view of a portion of the oral care system of FIG. 16.

FIG. 17A is a close-up view of a portion of the oral care system of FIG. 17.

FIG. 18A is a close-up view of a portion of the oral care system of FIG. 18.

DETAILED DESCRIPTION

Figure 1A:
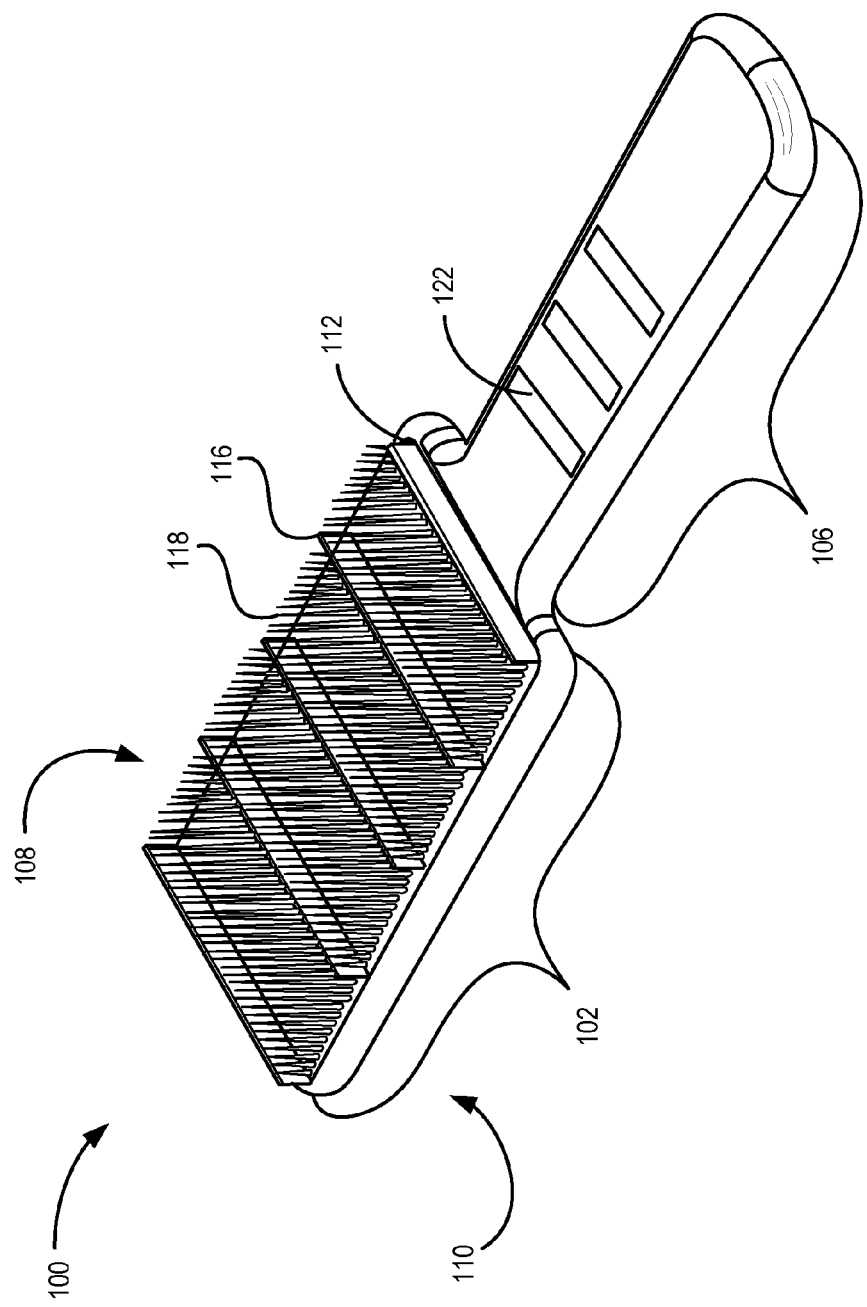
FIG. 1A is a perspective view of a tongue cleaning device, according to one embodiment of the present disclosure.

The various embodiments disclosed herein are generally directed to oral care devices, methods, and compositions and methods of using the same.

Many forms of treatment and care of an animal pertain to the oral cavity of the animal. For example, care of the animal's teeth and oral cavity may include cleaning. As another example, care for the animal's health may include delivery of vitamins, minerals, and other dietary and nutritional supplements to the oral cavity for ingestion by the animal. As still another example, treatment of a disease or other health condition of an animal may include delivery of medications, enzymes, or other treatment compositions to the oral cavity for ingestion by the animal.

Some of the disclosed embodiments of oral care devices are oral cleaning devices that may be used in cleaning the mouth of an animal. For example, one cause of bad breath in an animal is bacteria living on the surface of the animal's tongue. These bacteria produce odors. They also produce waste materials that are deposited on the animal's tongue that further produce odors. Food debris can also produce odors. Controlling an animal's bad breath may involve removing these bacteria, waste, debris, and other materials from the surface of the animal's tongue.

Removal of bacteria, waste, debris, and other materials can be difficult due to the texture and shape of the surface of the animal's tongue. The dorsal surface of the animal's tongue may be rough and covered with papillae. The animal's tongue may also have many grooves, fissures, indentations, ducts, and other small openings where taste buds and salivary glands are positioned. These grooves, fissures, indentations, ducts, and other small openings collect food debris, waste materials, and other materials, which provide a comfortable breeding ground that may attract bacteria. Moreover, the roughness of the surface of the animal's tongue presents challenges for cleaning the tongue because the bacteria, waste material, debris, and other materials are not easily removed from the small openings on the surface of the animal's tongue.

The disclosed oral cleaning devices may include tongue cleaning devices having a cleaning surface that may include a plurality of bristles and may further include a plurality of tongue scrapers. The animal's tongue may be cleaned by the cleaning surface as the animal licks the cleaning surface. The cleaning may be accomplished by both a physical brushing of bristles as well as tongue scraping of a scraper. Further, the brushing and tongue scraping of the present disclosure may be accomplished by the animal licking the cleaning surface and/or by a user brushing the tongue of the animal with the tongue cleaning device.

Some of the disclosed embodiments of oral care devices are oral delivery devices that may be used to deliver vitamins, minerals, dietary and/or nutritional supplements, medications, and the like to an animal. The disclosed delivery devices may include a delivery surface that may be configured to retain an oral care composition. The delivery surface may include a plurality of protrusions and/or a plurality of recesses that may be configured to retain the oral care composition on the delivery surface until the animal licks the delivery surface thereby delivering the oral care composition into the animal's oral cavity for ingestion by the animal.

Also disclosed herein are oral care systems comprising an oral care device and integrated oral care composition. The oral care device may be configured to include a reservoir that may house the oral care composition. The reservoir may be in fluid communication with a plurality of apertures that may extend through a cleaning surface and/or a delivery surface of the oral care device. Using an actuator, the user may control the amount of an oral care composition that is presented to the animal on the cleaning surface and/or the delivery surface of the oral care device.

Various embodiments of an oral care composition are disclosed herein. For example, an oral care composition may comprise an incentivizing agent that entices the animal to lick the cleaning surface and/or delivery surface of the disclosed oral care devices. The oral care composition may also comprise a nutritional supplement and/or medicament. The oral care composition may in be in the form of foam, liquid, liquid spray, gel, or paste. The oral care composition may be mixed, varied, and/or augmented/supplemented with optional and/or alternative supplements, medicaments, etc., according to a treatment regimen (e.g., such as a regimen recommended or prescribed by a veterinarian).

The present disclosure is also directed to methods of cleaning the tongue of an animal, such as for example, a dog or a cat, using the disclosed oral care devices and/or oral care compositions. For example, a user may obtain a tongue cleaning device having a cleaning surface and being configured to clean the tongue of the animal. The user may apply an oral care composition comprising an incentivizing agent to the cleaning surface of the tongue cleaning device. The user may then, while grasping the handle of the tongue cleaning device, present the cleaning surface of the tongue cleaning device to the animal. The user may then allow the animal to lick the cleaning surface of the tongue cleaning device thereby allowing the cleaning surface of the cleaning device to clean the tongue of the animal.

The present disclosure is also directed to methods of delivering an oral care composition to an animal. For example, a user may obtain a delivery device having a delivery surface configured to retain an oral care composition. The user may apply an oral care composition to the delivery surface of the delivery device. The user may then, while gasping the handle of the delivery device, present the delivery surface of the delivery device to the animal. The user may then allow the animal to lick the delivery surface of the delivery device thereby delivering the oral care composition onto the animal's tongue and into its oral cavity for ingestion by the animal. The oral care composition may include one or more of an incentivizing agent, an antimicrobial agent, a dietary supplement, a nutritional supplement, a biologically active enzyme, a probiotic agent, a prebiotic agent, and a medicament. As described above, the oral care composition may be mixed, varied, and/or augmented/supplemented with optional and/or alternative supplements, medicaments, etc., according to a treatment regimen (e.g., such as a regimen recommended or prescribed by a veterinarian).

The oral care devices, methods, and compositions disclosed herein may be used with a variety of animals, including dogs, cats, farm animals (e.g., horses, sheep, cows, goats, etc.), and/or zoo animals (e.g., monkeys, lions, tigers, bears, giraffes, zebras, etc.). Further, the oral care devices, methods, and compositions disclosed herein may be used with any animal that has a tongue that may extend from the mouth of the animal.

The embodiments disclosed herein may be best understood by reference to the drawings, wherein like parts are designated by like numerals throughout. It will be readily understood that the components of the present disclosure, as generally described and illustrated in the drawings herein, could be arranged and designed in a wide variety of different configurations. Thus, the following more detailed description of the embodiments of the apparatus is not intended to limit the scope of the disclosure, but is merely representative of possible embodiments of the disclosure. In some cases, well-known structures, materials, or operations are not shown or described in detail. While the various aspects of the embodiments are presented in drawings, the drawings are not necessarily drawn to scale unless specifically indicated. In some cases, well-known structures, materials, or operations are not shown or described in detail.

The phrases "connected to," "coupled to," and "in communication with" refer to any form of interaction between two or more entities, including but not limited to mechanical, electrical, magnetic, electromagnetic, fluid, and thermal interaction. Two components may be coupled to each other even though they are not in direct contact with each other. For example, two components may be coupled to each other through an intermediate component.

The terms "proximal" and "distal" refer to opposite ends of a device, including the cleaning and/or delivery devices disclosed herein. As used herein, the proximal end of a cleaning and/or delivery device is the end nearest a user, while the distal end of a cleaning and/or delivery device is the opposite end, nearest the animal.

Figure 1B:
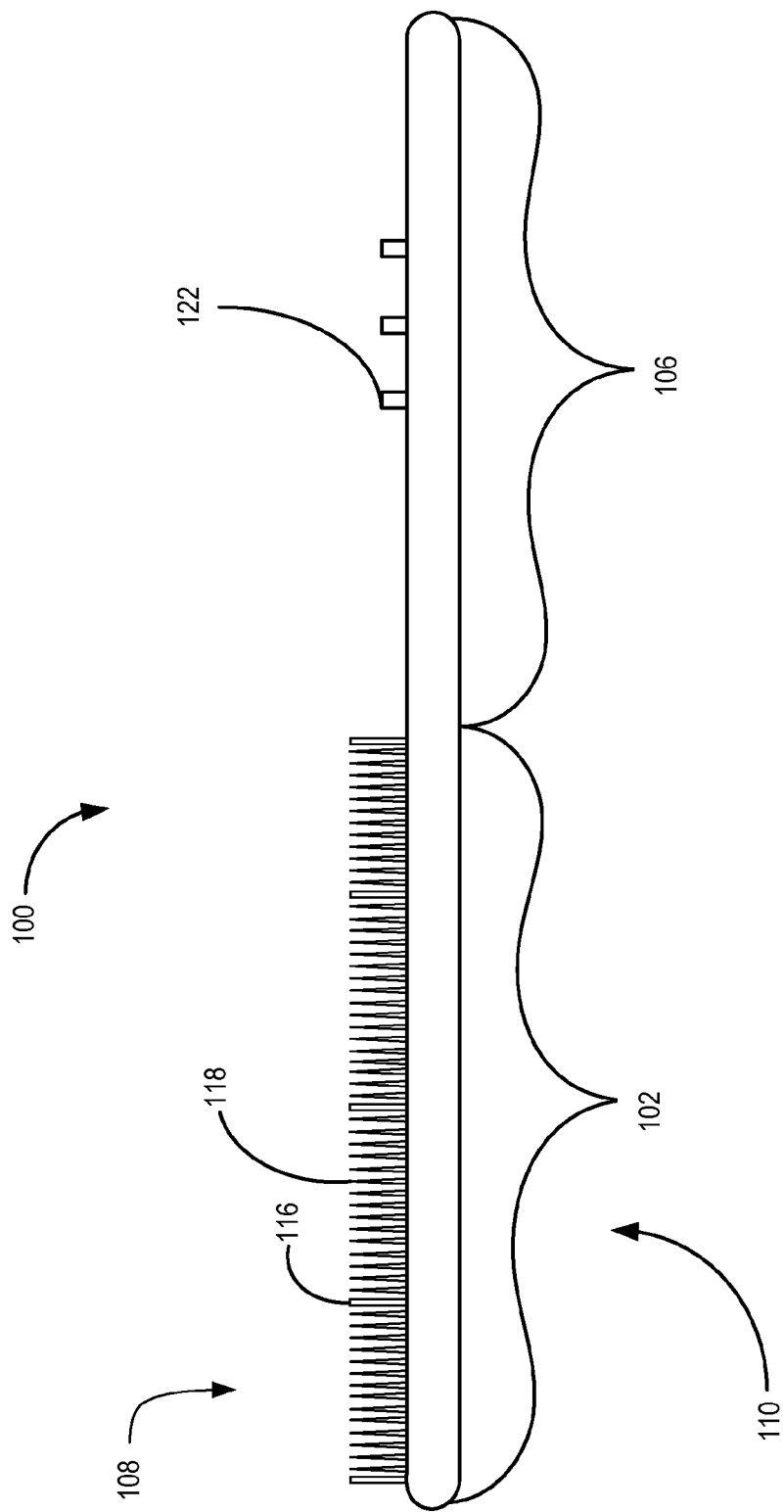
FIG. 1B is a side view of the tongue cleaning device of FIG. 1A.
Figure 1C:
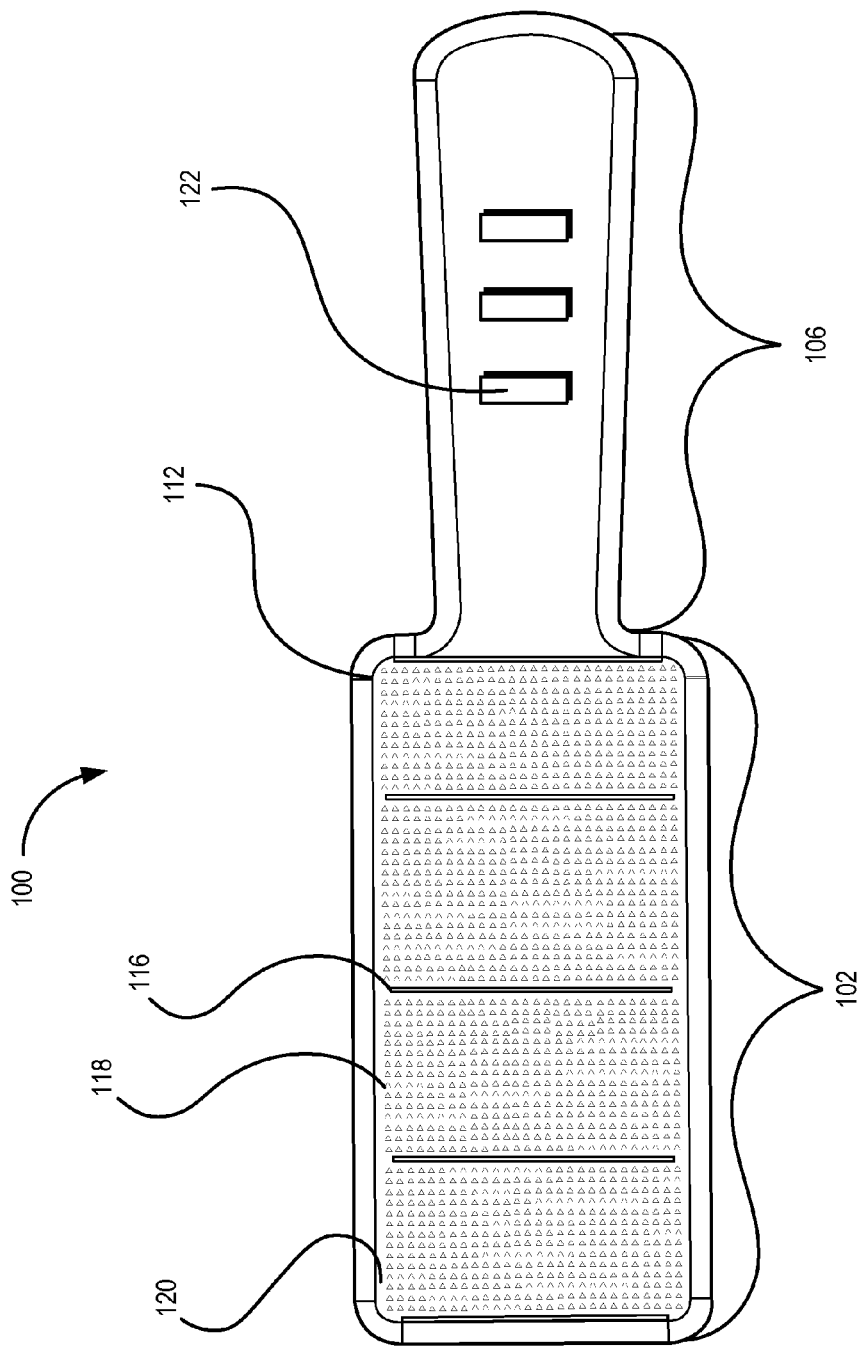
FIG. 1C is a top view of the tongue cleaning device of FIG. 1A.

FIGS. 1A-1C are views of an oral cleaning device 100, and specifically a tongue cleaning device 100, according to one embodiment of the present disclosure. FIG. 1A is a perspective view of a tongue cleaning device 100, according to one embodiment. FIG. 1B is a side view of the device 100 of FIG. 1A. FIG. 1C is a top view of the tongue cleaning device of FIG. 1A.

Referring collectively to FIGS. 1A-1C, the illustrated tongue cleaning device 100 is elongate and may include a head 102 at a distal end and a handle 106 at a proximal end. As shown in the illustrated embodiment, the head 102 may be coupled to the handle 106. In other embodiments, a neck may emanate from a distal end of the handle 106 thereby coupling the head 102 to the distal end of the handle 106.

The head 102 may include a first side 108 and a second side 110. In some embodiments, the first side 108 may include a cleaning surface 112, which may include a plurality of bristles 118 and a plurality of tongue scrapers 116. The bristles 118 may be licked by an animal, thereby creating a brushing action of the bristles 118 of the tongue cleaning device 100 on the surface of the animal's tongue to loosen bacteria, waste materials, food debris, and other materials from the surface of the animal's tongue. In other embodiments, the tongue cleaning device 100, and in particular the bristles 118 of the tongue cleaning device 100, may be used to brush the animal's tongue to loosen bacteria, waste materials, food debris, and other materials from the surface of the animal's tongue. In certain embodiments, the tongue scrapers 116 may be used to scrape away the loosened material during licking or brushing. In certain embodiments (such as the embodiment illustrated in FIG. 15), the second side may include a delivery surface that may be configured to retain an oral composition.

With continued reference to FIGS. 1A-1C, the bristles 118 may be tapered or cut to a point. The bristles 118 may be single-pointed, flexible, soft, individually mounted, non-tufted bristles. In other embodiments, other appropriate bristles 118 may be employed, including but not limited to bristles that are cut flat (e.g., toothbrush bristles). As depicted in FIG. 1C, the bristles 118 may be arranged in row and column format, but could be arranged otherwise as desired. In some embodiments, one or more bristles 118, or a portion of one or more bristles 118, may be configured to bend, arch slightly, or otherwise extend at a slight angle toward an end of the tongue cleaning device 100 to improve access to the small openings on the surface of the animal's tongue. For example, in some embodiments, one or more bristles 118 may be configured to bend or arch slightly toward the distal end of the tongue cleaning device 100 such that the bristles 118 extend at an angle transverse to a plane of the head 102. In other embodiments a portion of one or more bristles 118 may extend at an angle transverse to a plane of the head and toward the distal end of the head 102 or the distal end of the tongue cleaning device 100. In some embodiments, a portion of each of the one or more bristles 118 may extend toward the handle 106 or the proximal end of the tongue cleaning device 100.

As can be seen in FIG. 1C, the bristles 118 can emanate from a supporting base or bristle base 120 that may be configured to couple to the first side 108 of the head 102. The bristle base may be approximately 4 mm thick. Portions of the bristle base 120 may also pass through the head 102 to the back side 110, to secure the bristle base 120 and bristles 118 to the head 102. The bristles 118 and bristle base 120 may be formed of an elastic, flexible material, configured to give the bristles 118 a soft feel and to avoid damage or injury to the surface of the animal's tongue. The bristles 118 may be configured to reach down into the small openings and indentations of the animal's tongue to loosen and dislodge bacteria, waste material, food debris, and other material entrapped in the small openings and indentations.

In some embodiments, the height of the bristles 118 may be from about 4 mm to about 10 mm in length. In some embodiments, the tongue cleaning device 100 may include bristles 118 that are of different lengths or heights. For example, the bristles 118 disposed at the distal end of the head 102 may be relatively longer (e.g., about 10 mm in length), and those disposed toward the proximal end of the head 102 may be relatively shorter (e.g., about 4 mm in length). In other embodiments, the bristles 118 disposed at the proximal end of the head 102 may be relatively longer (e.g., about 10 mm in length), and those disposed toward the distal end of the head 102 may be relatively shorter (e.g., about 4 mm in length). In some embodiments, the bristles 118 may be arranged generally in order of ascending or descending height from the proximal end to the distal end of the head 102. In some embodiments, the bristles 118 may vary in length between tongue scrapers 116. For example, the bristles 118 may be arranged generally in order of ascending or descending height from a more proximal tongue scraper 116 to a more distal tongue scraper 116. In other embodiments, bristles 118 of different lengths or heights may be arranged on the head 102 in any configuration that is desired.

The plurality of tongue scrapers 116 may be intermittently spaced within the plurality of bristles 118, creating an alternating arrangement (e.g., a pattern) of a plurality of bristles 118 between tongue scrapers 116 (or a tongue scraper 116 between pluralities of bristles 118). Alternating pluralities of bristles 118 and tongue scrapers 116 in this manner may create a cleaning surface 112 wherein the cleaning ability remains the same or is substantially undiminished regardless of where the animal licks the cleaning surface 112.

In some embodiments, the plurality of tongue scrapers 116 may emanate from the bristle base 120. Each tongue scraper 116 may be about 0.5 mm thick. In some embodiments, the tongue scrapers 116 may be approximately the same height as the bristles 118. In some embodiments, the tongue scrapers 116 may be from about 3 mm tall to about 10 mm tall. In other embodiments, the tongue scrapers 116 may be taller or shorter, and/or thicker or thinner, depending on the desired application of the tongue cleaning device 100. The shape of the tongue scrapers 116 also may vary. For example, in some embodiments, the tongue scrapers 116 may include a squared off edge. In other embodiments, the tongue scrapers 116 may include a sharp or rounded edge as desired.

In some embodiments, the tongue scrapers 116 may include one or more tongue scraper blades that may be more rigid than the bristles 118 yet remain substantially flexible so as to not damage or injure the surface of the animal's tongue. For example, in some embodiments, the tongue scrapers 116 may include three sets of primary and secondary flexible scraper blades. The pair of secondary scraper blades may be shorter in height than the single primary scraper blade and may be located adjacent either side of the primary scraper blade. The secondary scraper blades may serve to provide the primary scraper blade with lateral structural support and increase its effectiveness. In the event the primary scraper blade does not collect all of the debris, a secondary blade may pick up the remainder.

The bristles 118 and tongue scrapers 116 may be arranged on the cleaning surface 112 of the tongue cleaning device 100 in a variety of ways. Moreover, any number of bristles 118 and tongue scrapers 116 may be arranged on the cleaning surface 112. In the illustrated embodiment of FIGS. 1A-1C, for example, four separate pluralities of bristles 118 and five tongue scrapers 116 are disposed on the cleaning surface 112. In the illustrated embodiment, a first tongue scraper 116 is disposed at a proximal end of the cleaning surface 112 and a first plurality of bristles 118 is disposed distal to the first tongue scraper 116. Tongue scrapers 116 and pluralities of bristles 118 then alternate along the longitudinal direction of the head 102. As shown in FIGS. 1A-1C, a tongue scraper 116 may also be disposed at a distal end of the cleaning surface 112. Alternatively, the device 100 may include bristles 118 rather than tongue scrapers 116 at the proximal and/or distal ends of the cleaning surface 112.

In some embodiments, the tongue cleaning device 100 may be configured such that one or more tongue scrapers 116 are disposed in a transverse direction along the cleaning surface 112. In other embodiments, one or more tongue scrapers 116 may be disposed in a longitudinal direction along the cleaning surface 112. In some embodiments, one or more tongue scrapers 116 may be disposed at an angle that is approximately 45 degrees from the longitudinal axis of the device 100. Accordingly, one or more tongue scrapers 116 may be disposed at any desired location, and in any desired orientation, on the cleaning surface 112.

A user may apply an oral care composition, such as described below, comprising an incentivizing agent to the cleaning surface 112 of the tongue cleaning device 100 to incentivize the animal to lick the cleaning surface. The user may then, while grasping the handle 106 of the tongue cleaning device 100, present the cleaning surface of the tongue cleaning device to the animal. The user may then allow the animal to lick the cleaning surface 112 of the tongue cleaning device thereby allowing the cleaning surface 112 of the cleaning device 100 to clean the tongue of the animal. The bristles 118 and/or the cleaning surface 112 and the oral care composition may be designed such that the oral care composition will move down into the base of the bristles 118, toward the bristle base 120, so at least a portion of the oral care composition is not readily available to the animal so as to inhibit or prevent removal of all of the oral care composition by the tongue of the animal as it licks the cleaning surface 112. In this manner, sufficient incentivizing agent (e.g., flavoring) may remain among the bristles 118 to stimulate the animal to continue licking, although, no matter how long it licks, the animal is unable to remove all of the flavor. The animal is perpetually incentivized to always want to lick more incentivizing agent from the cleaning surface 112. Where a nutritional supplement may be included with the oral care composition, the nutritional supplement may be added in a quantity to account for the extra amount that cannot be licked off the cleaning surface 112 by the animal.

As illustrated in FIGS. 1A-1C, the device 100 may include ridged finger and/or hand grips 122 on the handle 106 to enhance handling and manipulation of the tongue cleaning device 100. Finger and/or hand grips 122 may aid in handling the tongue cleaning device 100 while the tongue cleaning device 100 is being presented to an animal. For instance, a user may grasp the handle 106 of the tongue cleaning device 100 such that the user's fingers wrap around the handle 106 of the tongue cleaning device 100 and come in contact with the finger and/or hand grips 122. With the head 102 of the tongue cleaning device 100 directed away from the user, the user may present the tongue cleaning device 100 to an animal. The finger and/or hand grips 122 may then provide a gripping function such that the device 100 does not rotate while it is being licked by an animal.

Figure 2:
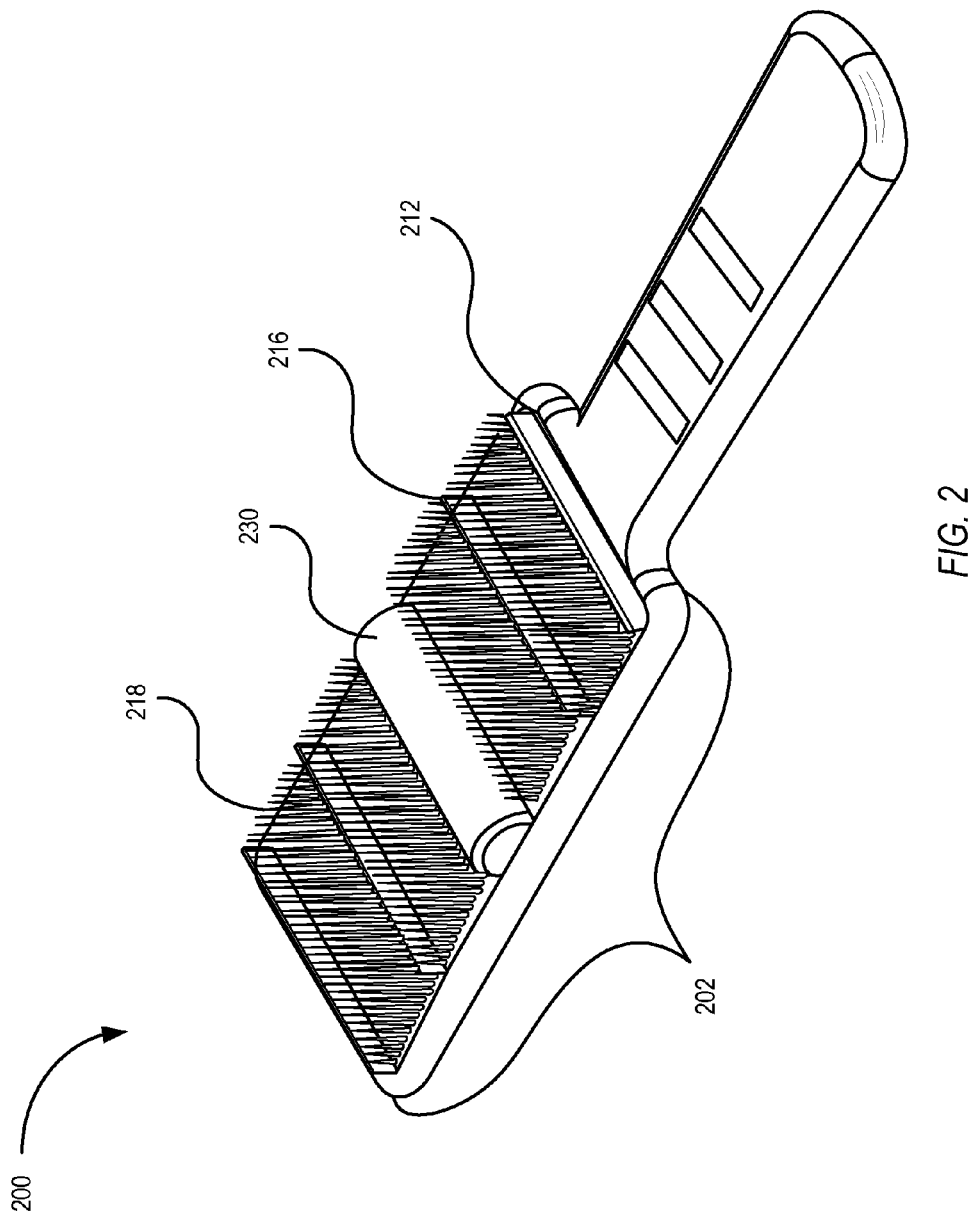
FIG. 2 is a perspective view of a tongue cleaning device, according to one embodiment of the present disclosure.

FIG. 2 is a perspective view of another embodiment of a tongue cleaning device 200 further comprising a depressor 230. The tongue cleaning device 200 can, in certain respects, resemble components of the device described in connection with FIGS. 1A-1C above. It will be appreciated that all the illustrated embodiments may have analogous features. Accordingly, like features are designated with like reference numerals, with the leading digits incremented to "2." (For instance, the tongue cleaning device is designated "100" in FIGS. 1A-1C, and an analogous tongue cleaning device is designated as "200" in FIG. 2.) Relevant disclosure set forth above regarding similarly identified features thus may not be repeated hereafter. Moreover, specific features of the tongue cleaning device and related components shown in FIG. 2 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the device of FIG. 2. Any suitable combination of the features, and variations of the same, described with respect to the tongue cleaning device 100 and components illustrated in FIGS. 1A-1C, can be employed with the tongue cleaning device 200 and components of FIG. 2, and vice versa. This pattern of disclosure applies equally to further embodiments depicted in subsequent figures and described hereafter.

As illustrated in FIG. 2, the tongue cleaning device 200 may include a plurality of bristles 218, a plurality of tongue scrapers 216, and one or more depressors 230. As shown in the illustrated embodiment, the tongue scrapers 216 and the depressor 230 may be disposed in a transverse direction along the cleaning surface 212 of the head 202. In other embodiments, the depressor 230 may be disposed in a longitudinal direction along the cleaning surface 212 of the head 202. In other embodiments, the depressor 230 may be disposed on the cleaning surface 212 of the head 202 in a direction that is neither transverse nor longitudinal. In yet other embodiments, such as, for example, embodiments wherein the depressor 230 is substantially semi-spherical in shape, the depressor 230 may not extend in any direction and may be disposed anywhere along the cleaning surface 212 of the head 202. In the illustrated embodiment, the depressor 230 is disposed at approximately the midpoint of the head 202, however, the depressor 230 may be disposed at any location on the head 202 as desired.

The depressor 230 may emanate from the bristle base and may serve a variety of functions. For example, the depressor 230 may be configured to alter the surface of the animal's tongue thereby presenting the surface of the animal's tongue to the bristles 218 and/or tongue scrapers 216 at an angle to a plane of the cleaning surface 212 rather than parallel to the plane of the cleaning surface 212. Presenting the tongue at an angle to a plane of the cleaning surface 212 rather than parallel to the plane of the cleaning surface 212 may enable the bristles 218 and/or tongue scrapers 216 to more efficiently and effectively remove the waste material from the animal's tongue.

The height of the depressor 230 may be configured to be the same as the height of the tongue scrapers 216 so that they both touch the surface of the animal's tongue at the same time. In some embodiments, one or more depressors 230 may cause a depression in the animal's tongue thereby absorbing some or most of the pressure that is applied to the tongue cleaning device 200 during the cleaning process. This may reduce the scraping pressure of the tongue scraper 216, and may assist in the cleaning process by reducing the chance of injury to the animal's tongue by the tongue scraper 216.

In some embodiments, such as the embodiment of FIG. 2, the depressor 230 may be designed such that it is semi-cylindrical (i.e., half of a cylinder) in shape. In some embodiments, the depressor 230 may be substantially rounded in shape. In some embodiments, the depressor 230 may be designed such that it is substantially semi-spherical (i.e., half of a sphere) or substantially semi-ellipsoidal (i.e., half of an ellipsoid) in shape. The surface of the depressor 230 may be smooth; however, variations of the surface may be used to permit the tongue to drag along the surface of the depressor 230. One of the variations could be a series of random humps or bumps on the surface of the depressor 230. Another variation could consist of a number of ridges running from one end of the depressor 230 to the other in parallel to each other. Another variation could be to construct a rough surface, similar to sand paper. All of these variations have the purpose of increasing the abrasive nature of the surface of the depressor 230 so as to aid in the cleaning of the animal's tongue. The primary purpose of the depressor 230, however, is to: (a) receive the primary pressure that is applied to the tongue cleaning device 200 when the device 200 is placed on the tongue surface; and (b) cause an indentation in the tongue surface in such a way as to present the tongue surface to the bristles 218 and tongue scrapers 216 at an angle to a plane of the cleaning surface 212 rather than parallel to the plane of the cleaning surface 212.

In another embodiment, the depressor 230 may be composed of a movable drum roller designed to roll across the surface of the animal's tongue rather than slide along the surface of the animal's tongue. The drum roller may cause an indentation in the tongue surface thus presenting the tongue surface to the bristles 218 and/or tongue scrapers 216 at an angle to a plane of the cleaning surface 212 rather than parallel to the plane of the cleaning surface 212. The drum roller also takes the primary pressure of the device 200 and reduces the chance that the tongue scraper 216 may cause any damage to the tender tongue surface tissue.

The surface of the movable drum roller may be smooth; however, variation of the surface may be used to permit the moveable drum roller to become involved in the cleaning process. One of the variations could be a series of random humps or bumps on the surface. Another variation could consist of a series of randomly placed bristles that are soft and pointed. The points of the bristles would penetrate the waste material that is held in the various crevices of the tongue surface, loosening them so that the scraper could carry the material to the front of the animal's tongue to be discarded.

Figure 3:
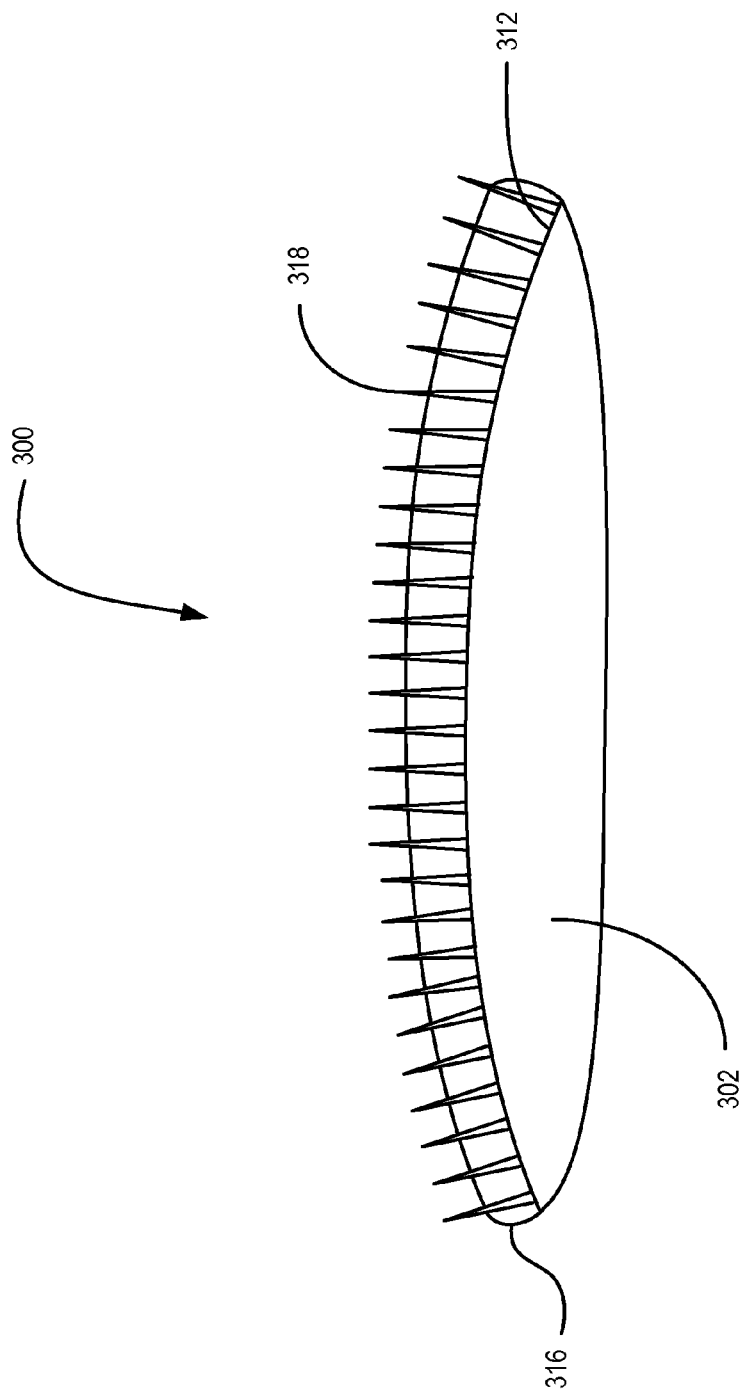
FIG. 3 is a front view of a tongue cleaning device, according to one embodiment of the present disclosure.

FIG. 3 is a front view of another embodiment of a tongue cleaning device 300 wherein a plurality of bristles 318 are located at the distal end of the head 302, and the head 302 and cleaning surface 312 are arcuate (e.g., curved) in shape along the transverse direction of the tongue cleaning device 300. In other embodiments, the head 302 and cleaning surface 312 may be arcuate in shape along the longitudinal direction of the tongue cleaning device 300. In yet other embodiments, the head 302 and cleaning surface 312 may be arcuate in shape along the transverse and longitudinal directions of the device 300. In another embodiment, the head 302 and cleaning surface 312 may be substantially semi-ellipsoidal (i.e., half of an ellipsoid) or semi-spherical (i.e., half of a sphere) in shape. As can be appreciated, the arcuate shape of the head 302 and cleaning surface 312 may form either a convex or concave surface. Altering the shape of the head 302 and the cleaning surface 312 of the tongue cleaning device 300 may affect the way the bristles 318 and tongue scrapers 316 come in contact with the animal's tongue to improve access to the small openings on the surface of the animal's tongue. In other embodiments, the head 302 and cleaning surface 312 may be substantially flat or linear in the transverse and/or longitudinal directions of the tongue cleaning device 300.

Figure 4:
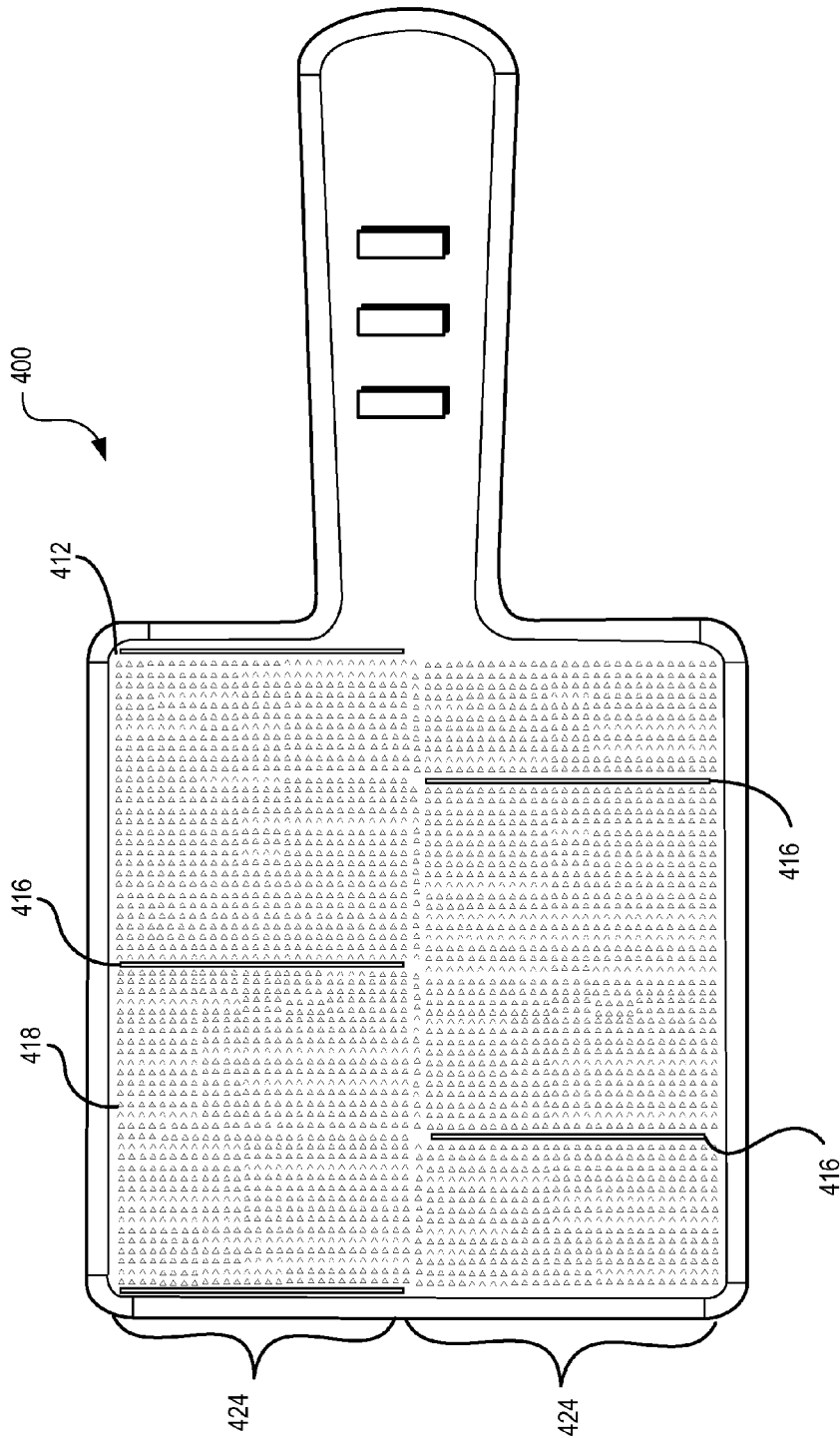
FIG. 4 is a top view of a tongue cleaning device, according to one embodiment of the present disclosure.

FIG. 4 is a top view of another embodiment of a tongue cleaning device 400. As depicted in the illustrated embodiment of FIG. 4, the tongue cleaning device 400 may include a plurality of longitudinal segments 424 that are arranged adjacent one another in a transverse direction along the cleaning surface 412. Each longitudinal segment 424 may include a plurality of bristles 418 and one or more tongue scrapers 416. In some embodiments, each longitudinal segment 424 may further include one or more depressors. In the illustrated embodiment, the tongue scrapers 416 in adjacent longitudinal segments 424 are disposed and oriented such that they are not aligned with one another along the transverse direction of the cleaning surface 412. In other embodiments, the tongue scrapers 416 in adjacent longitudinal segments 424 may be disposed and oriented such that they are aligned with one another along the transverse direction of the cleaning surface 412.

Figure 5:
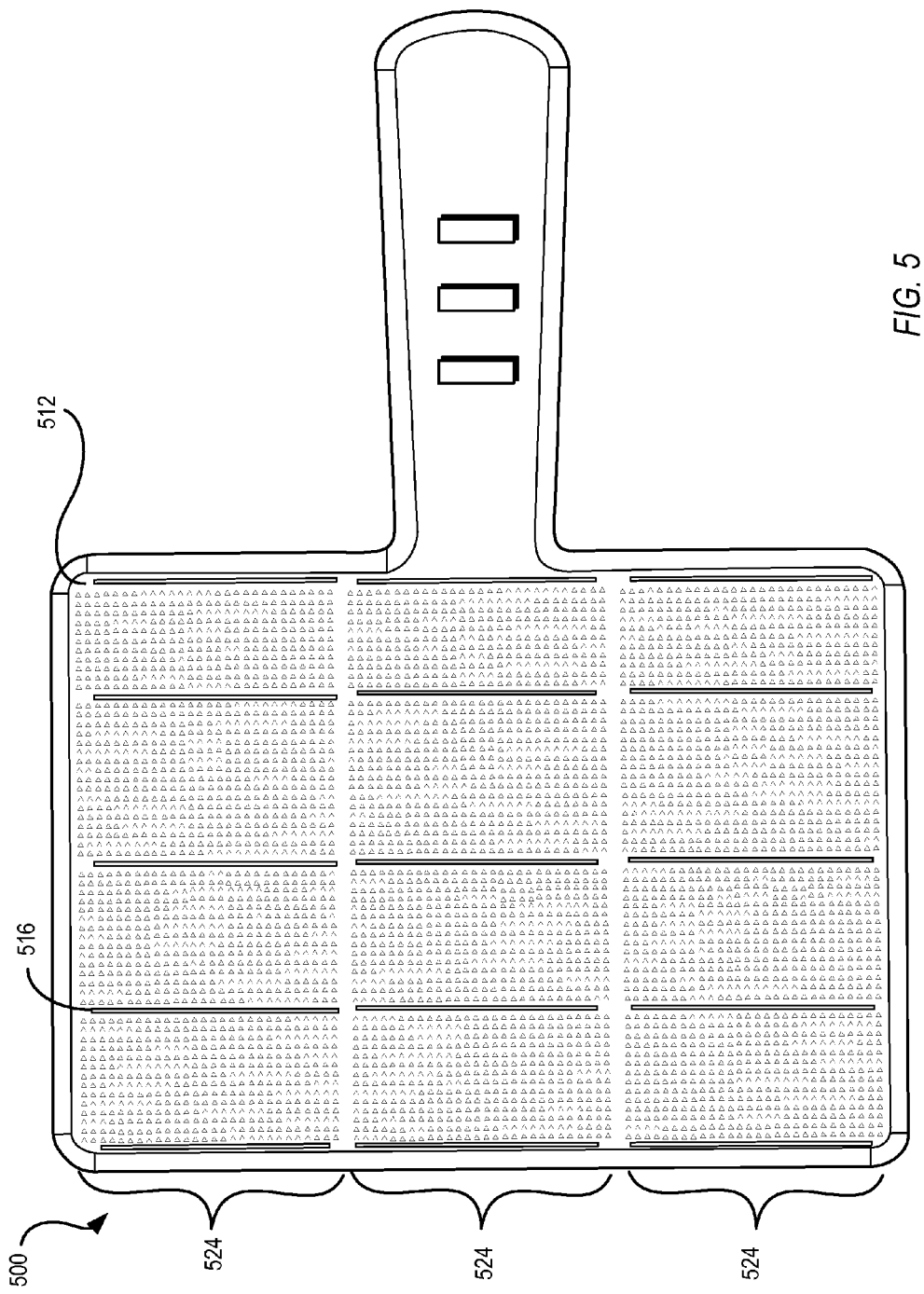
FIG. 5 is a top view of a tongue cleaning device, according to one embodiment of the present disclosure.

FIG. 5 is a top view of another embodiment of a tongue cleaning device 500 comprising a plurality of longitudinal segments 524 arranged adjacent one another in a transverse direction along the cleaning surface 512. As further illustrated, the tongue cleaning device 500 includes three longitudinal segments 524. The tongue scrapers 516 in adjacent longitudinal segments 524 are disposed such that they are aligned with one another along the transverse direction of the cleaning surface 512.

Figure 6:
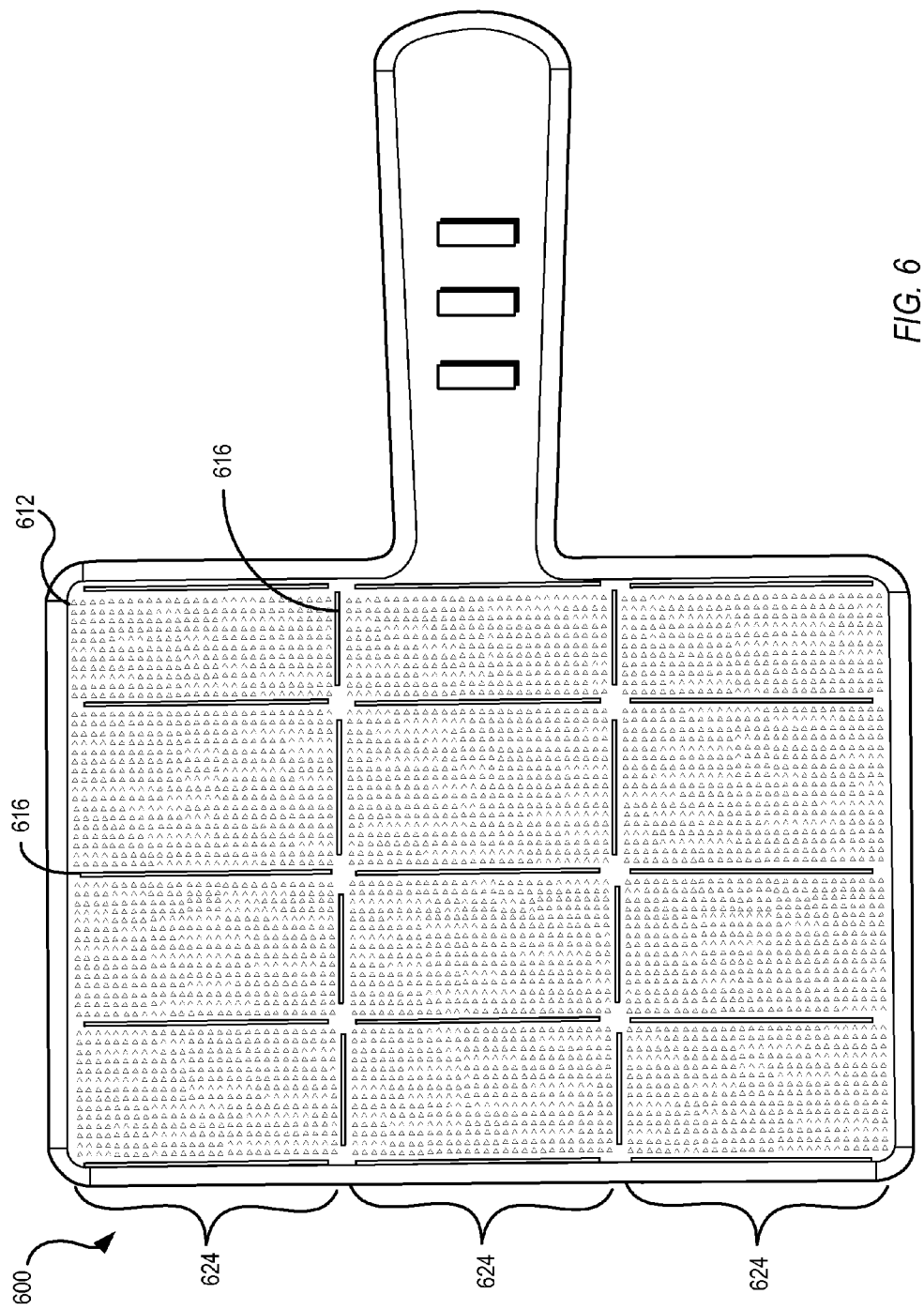
FIG. 6 is a top view of a tongue cleaning device, according to one embodiment of the present disclosure.

FIG. 6 is a top view of another embodiment of a tongue cleaning device 600 comprising a plurality of longitudinal segments 624 arranged adjacent one another in a transverse direction along the cleaning surface 612. As further illustrated, the cleaning surface 612 includes a plurality of tongue scrapers 616 disposed in a transverse direction. The cleaning surface 612 may further include a plurality of tongue scrapers 616 disposed in a longitudinal direction.

Figure 7:
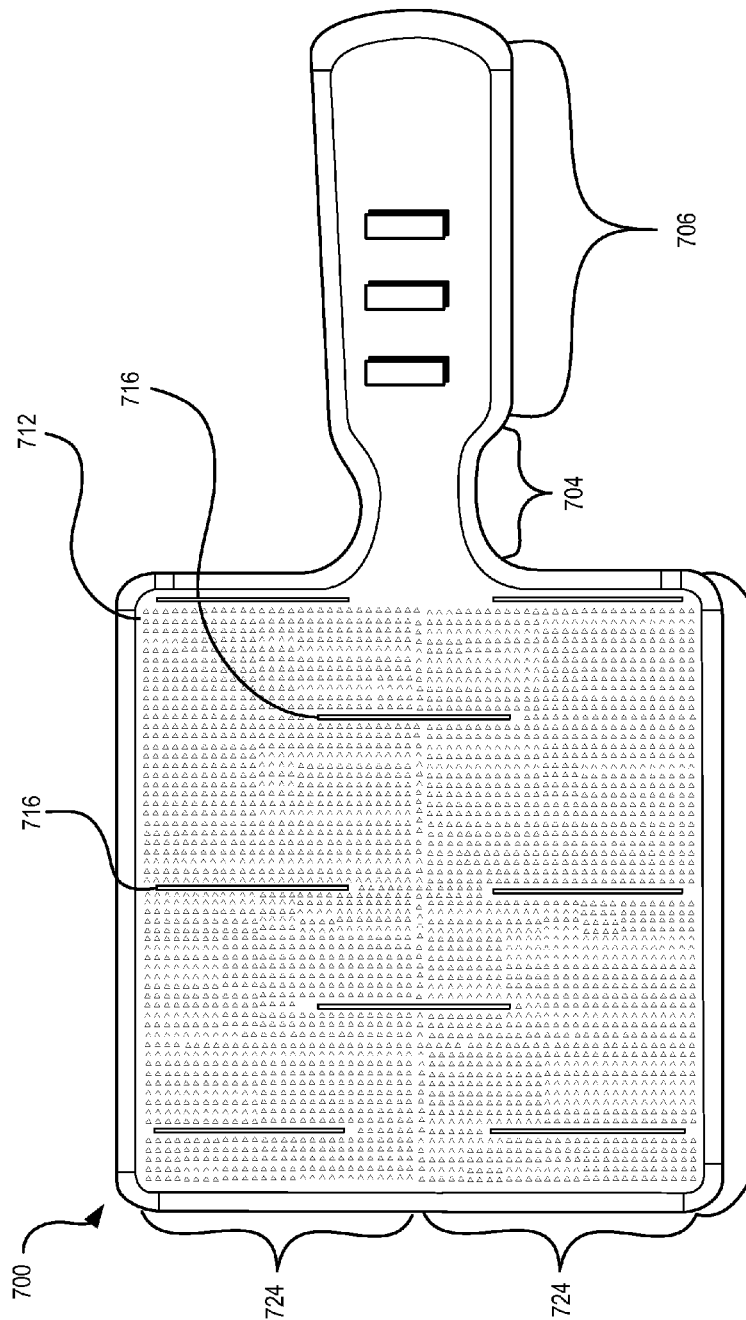
FIG. 7 is a top view of a tongue cleaning device, according to one embodiment of the present disclosure.

FIG. 7 is a top view of another embodiment of a tongue cleaning device 700 comprising a plurality of longitudinal segments 724 arranged adjacent one another in a transverse direction along the cleaning surface 712. As further illustrated, the tongue scrapers 716 are disposed such that they are not aligned with one another along the longitudinal direction of the cleaning surface 712. Moreover, as depicted in FIG. 7, one or more tongue scrapers 716 may span across adjacent longitudinal segments 724.

The embodiment of FIG. 7 further includes a neck 704 emanating from a distal end of the handle 706. The neck 704 couples the head 702 to the distal end of the handle 706. The neck 704 may be angled for ease in holding the device 700 while presenting the tongue cleaning device 700 to an animal. For example, the neck 704 may be angled from about 0 degrees to about 45 degrees or more from the longitudinal axis of the handle 706 of the tongue cleaning device 700.

Figure 8:
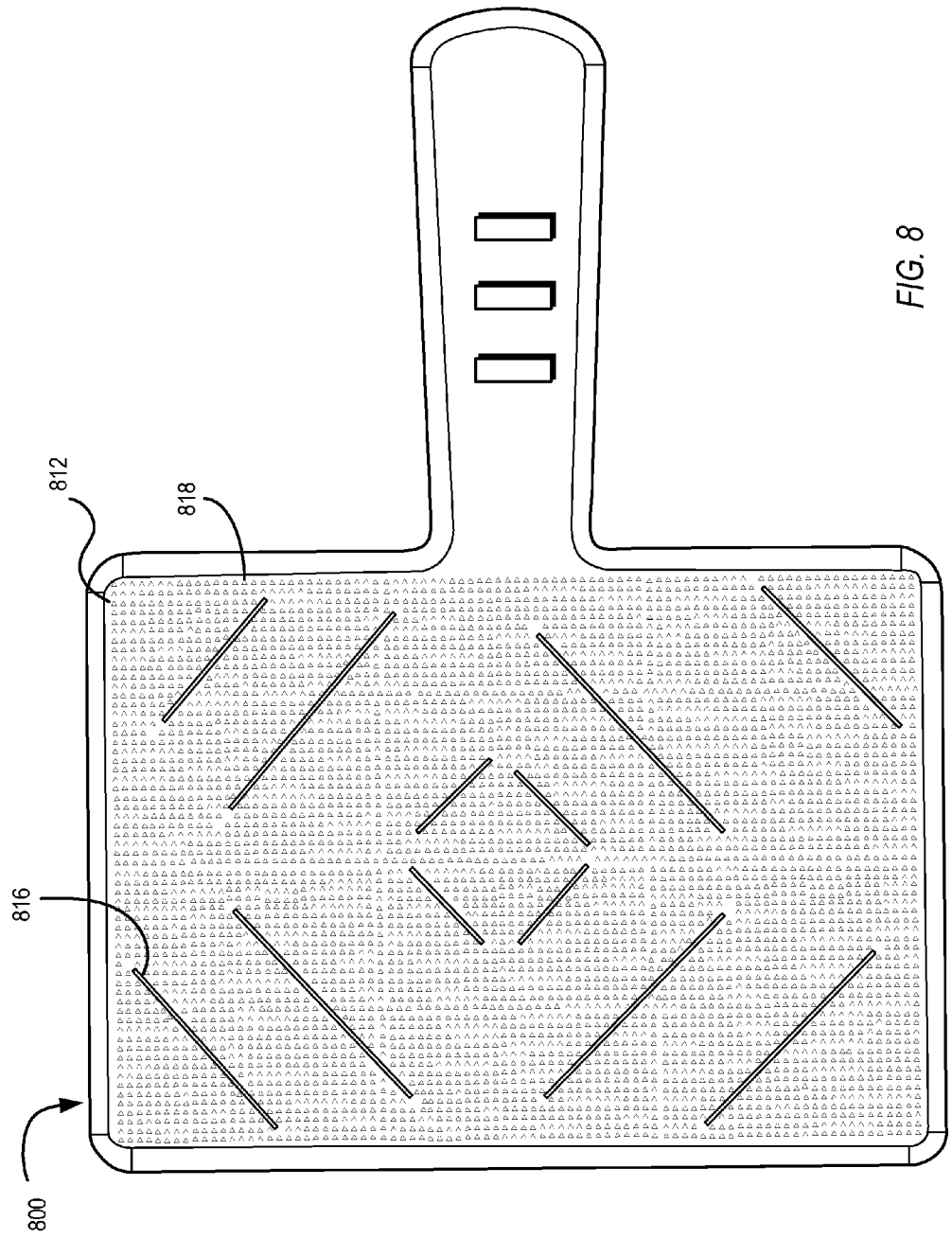
FIG. 8 is a top view of a tongue cleaning device, according to one embodiment of the present disclosure.

FIG. 8 is a top view of another embodiment of a tongue cleaning device 800 comprising a plurality of bristles 818 and a plurality of tongue scrapers 816. As further illustrated, the tongue scrapers 816 are disposed such that they are at an angle that may be between 30 degrees and 60 degrees, for example, approximately 45 degrees, from the longitudinal axis of the tongue cleaning device 800. The tongue scrapers 816 of the present disclosure may further be disposed at any desired location, and in any desired orientation, on the tongue cleaning surface 812.

Moreover, the tongue cleaning device 800 of FIG. 8 may include tongue scrapers 816 of varying lengths. In other embodiments, the device 800 may include tongue scrapers 816 that are substantially the same size and shape.

Figure 9:
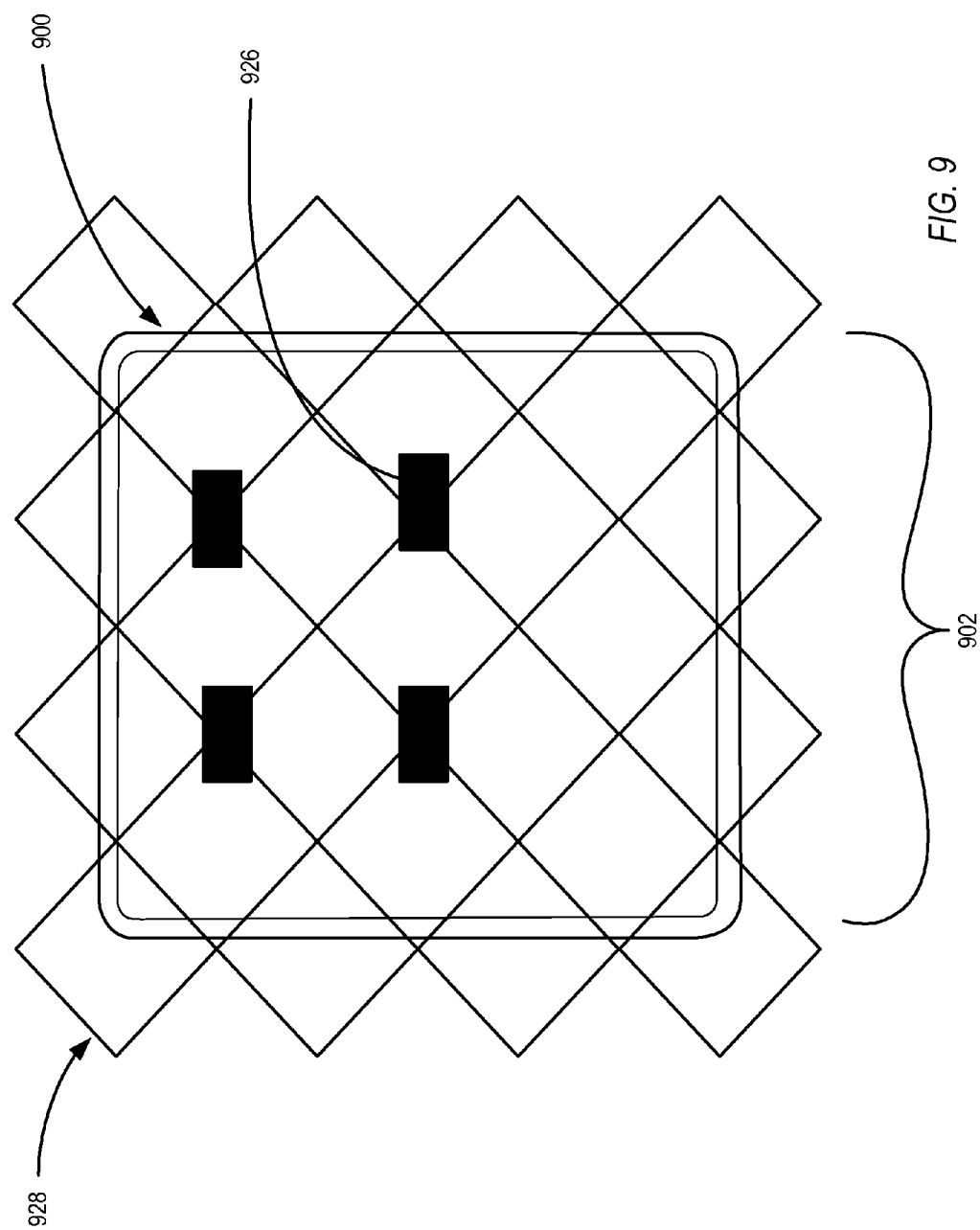
FIG. 9 is a back side view of an oral care device coupled to a fence, according to one embodiment of the present disclosure.

FIG. 9 is a bottom view of an embodiment of an oral care device 900 comprising connectors 926 that may be configured to attach the oral care device 900 to a wall or fence structure 928. The connectors 926 may be ties, latches, hooks, or any other devices suitable for attaching the oral care device 900 to a wall or fence structure 928. In the illustrated embodiment, the oral care device 900 may only include a head 902, but could also include a handle if desired. The connectors 926 may be disposed on the back side of the head 902 and may be beneficial in instances where the user does not desire to handle the oral care device 900 while presenting the oral care device 900 to an animal. For instance, the animal may be overly aggressive such that the user may fear being attacked by the animal. In other situations, the user may not have time to present the oral care device 900 to the animal. Accordingly, the user may attach the oral care device 900 to a wall or fence structure.

Figure 10A:
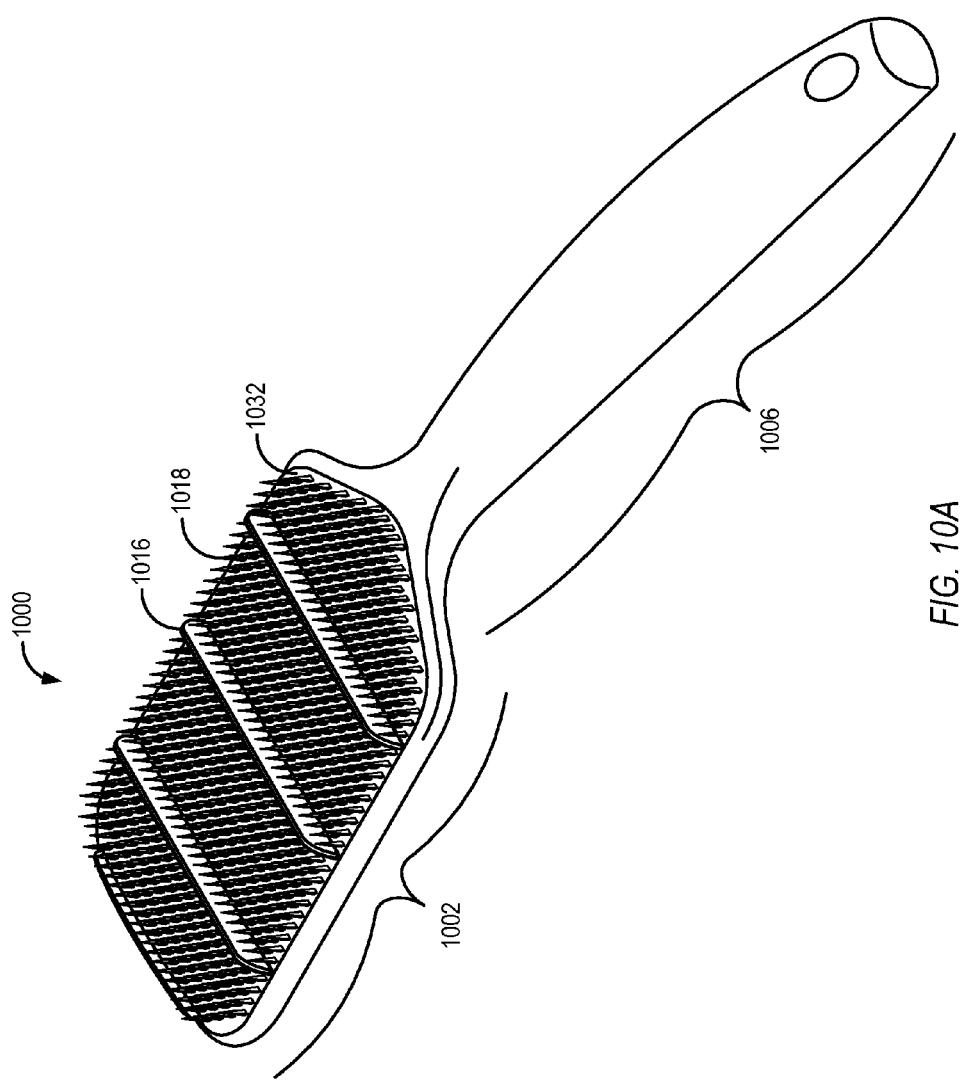
FIG. 10A is a perspective view of a tongue cleaning device, according to one embodiment of the present disclosure.
Figure 10B:
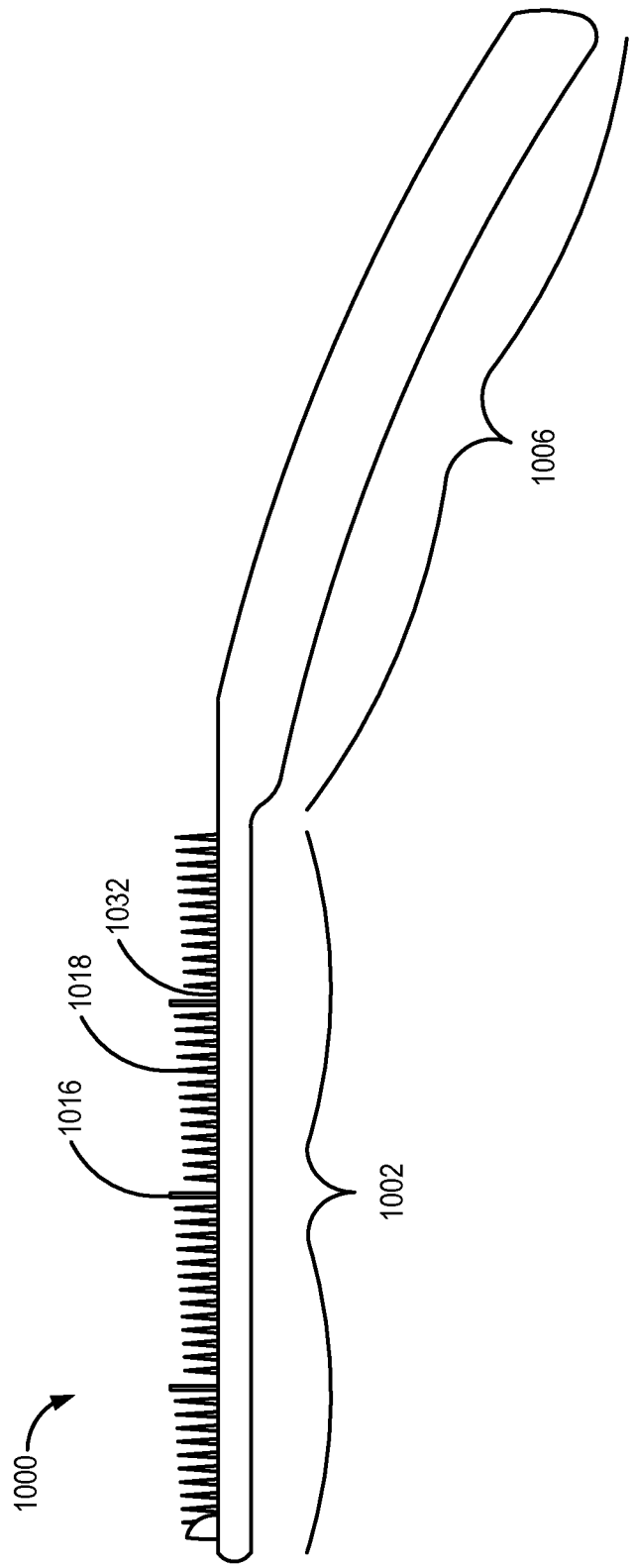
FIG. 10B is a side view of the tongue cleaning device of FIG. 10A.

FIGS. 10A and 10B are illustrative views of another embodiment of a tongue cleaning device 1000. FIG. 10A is a perspective view of the tongue cleaning device 1000, and FIG. 10B is a side view of the tongue cleaning device 1000. As shown in FIGS. 10A and 10B, the tongue cleaning device 1000 may include a plurality of bristles 1018 and a plurality of tongue scrapers 1016. The head 1002 may also be coupled to the handle 1006. The head 1002 may be coupled to the handle 1006 such that the head 1002 is angled relative to the handle 1006. For example, the head 1002 may be angled from about 0 to about 45 degrees or more from the longitudinal axis of the handle 1006 of the tongue cleaning device 1000. Accordingly, the head 1002 may be in a different plane than the handle 1006. As shown in FIG. 10B, in some embodiments, the plane of the cleaning surface 1032, including the plurality of bristles 1018, may be angled away from the handle 1006. In other embodiments, the plane of the cleaning surface 1032, including the plurality of bristles 1018, may be angled towards the handle 1006.

In some embodiments, the handle 1006 may also be curved, angled, or otherwise bent such that it does not extend linearly along a defined longitudinal axis. For example, the handle 1006 may be substantially arcuate as it extends from its proximal end towards its distal end where it may be coupled to the head 1002.

FIG. 11 is a perspective view of an embodiment of an oral care device 1100, and specifically an oral delivery device 1100 comprising a delivery surface 1132. The delivery surface 1132 may be disposed on a first side 1108 of the head 1102 and may be configured to retain an oral care composition. In other embodiments, the delivery surface 1132 may be disposed on a second side 1110 of the head 1102. Various delivery surfaces 1132 may be used. For example, the delivery surface 1132 may include a plurality of protrusions 1134. The plurality of protrusions 1134 may be disposed on and extend outwardly from the delivery surface 1132 in a direction that is substantially perpendicular to the delivery surface 1132. In other embodiments, the plurality of protrusions 1134 may extend outwardly from the delivery surface 1132 in a direction that is not substantially perpendicular to the delivery surface 1132, rather the plurality of protrusions 1134 may extend outwardly and towards an end or side of the delivery device 1100.

The protrusions 1134 need not be limited to any particular shape and/or size. Rather, the protrusions 1134 may be capable of at least temporarily retaining the oral care composition until the delivery device 1100 may be presented to an animal. Accordingly, protrusions 1134 of various shapes and sizes may be used. In some embodiments, the protrusions 1134 may be tapered to a point. For example, the protrusions 1134 may be shaped substantially similar to the bristles previously discussed in relation to FIG. 1. However, it is desirous that the protrusions 1134 be configured such that an animal may lick the oral care composition free from the delivery surface 1132 of the delivery device 1100. Thus, the protrusions 1134 may be shorter, thicker, and/or made of a more rigid material than the bristles disclosed in relation to FIGS. 1A-1C.

As shown in FIG. 11A, in some embodiments, the protrusions 1134 may include a first portion that is substantially cylindrical shaped. The protrusions 1134 may further include a second portion that is substantially rounded. In other embodiments, the second portion may be substantially flat. In some embodiments, the protrusions 1134 may include an end portion that is substantially rounded. The diameter of the substantially cylindrical and/or substantially rounded portions of the protrusions 1134 may be about 1 mm, although other sizes may be used. For example, the diameter of the substantially cylindrical and/or substantially rounded portions of the protrusions 1134 may be between about 0.5 mm and about 5 mm. In other embodiments, the diameter of the substantially cylindrical and/or substantially rounded portions of the protrusions 1134 may be between about 1 mm and about 4 mm. In still other embodiments, the diameter of the substantially cylindrical and/or substantially rounded portions of the protrusions 1134 may be between about 2 and about 3 mm.

The height of the protrusions 1134 may also vary. In some embodiments, for example, the protrusions 1134 may extend outwardly from the delivery surface 1132 for a distance of about 1 mm. In other embodiments, the protrusions 1134 may extend outwardly from the delivery surface 1132 for a distance of greater than about 1 mm. In yet other embodiments, the protrusions 1134 may extend outwardly from the delivery surface 1132 for a distance of less than about 1 mm. Other distances may also be used. For example, the protrusions 1134 may extend outwardly from the delivery surface 1132 for a distance of between about 0.5 mm and about 5 mm. In other embodiments, the protrusions 1134 may extend outwardly from the delivery surface 1132 for a distance of between about 1 mm and about 4 mm. In still other embodiments, the protrusions 1134 may extend outwardly from the delivery surface 1132 for a distance of between about 2 and about 3 mm.

In some embodiments, the substantially rounded end portion of the protrusions 1134 may extend outwardly from the delivery surface 1132 for a distance of about 1 mm. In other embodiments, the substantially rounded end portion of the protrusions 1134 may extend outwardly from the delivery surface 1132 for a distance of greater than about 1 mm. In yet other embodiments, the substantially rounded end portion of the protrusions 1134 may extend outwardly from the delivery surface 1132 for a distance of less than about 1 mm, although other distances may be used. For example, the substantially rounded end portion of the protrusions 1134 may extend outwardly from the delivery surface 1132 for a distance of between about 0.5 mm and about 5 mm. In other embodiments, the substantially rounded end portion of the protrusions 1134 may extend outwardly from the delivery surface 1132 for a distance of between about 1 mm and about 4 mm. In still other embodiments, the substantially rounded end portion of the protrusions 1134 may extend outwardly from the delivery surface 1132 for a distance of between about 2 and about 3 mm.

In some embodiments, the delivery surface 1132 may further include a depressor, such as the depressor described above in relation to FIG. 2. The depressor may be any of the shapes and/or sizes described above and may be disposed on the delivery surface 1132 in any manner similar to that described above with regard to the cleaning surface.

FIG. 12 is a perspective view of another embodiment of an oral delivery device 1200 comprising a plurality of protrusions 1234 disposed on a delivery surface 1232. As shown in FIG. 12A, the protrusions 1234 may include a substantially cylindrical portion, a substantially rounded portion 1236, and a plurality of elongated members 1235. The plurality of elongated members 1235 may be disposed on and extend outwardly from the substantially rounded portion 1236 in a direction that is substantially perpendicular to the delivery surface 1232. In other embodiments, the plurality of elongated members 1235 may be disposed on and extend outwardly from the substantially rounded portion 1236 in a direction that is not substantially perpendicular to the delivery surface 1232. In some embodiments, the plurality of elongated members 1235 may be disposed on and extend outwardly from the substantially rounded portion 1236 in a variety of random directions. The elongated members 1235 may be soft and may aid in retaining a portion of the oral care composition until the delivery device 1200 is presented to an animal.

Figures 13, 13A:
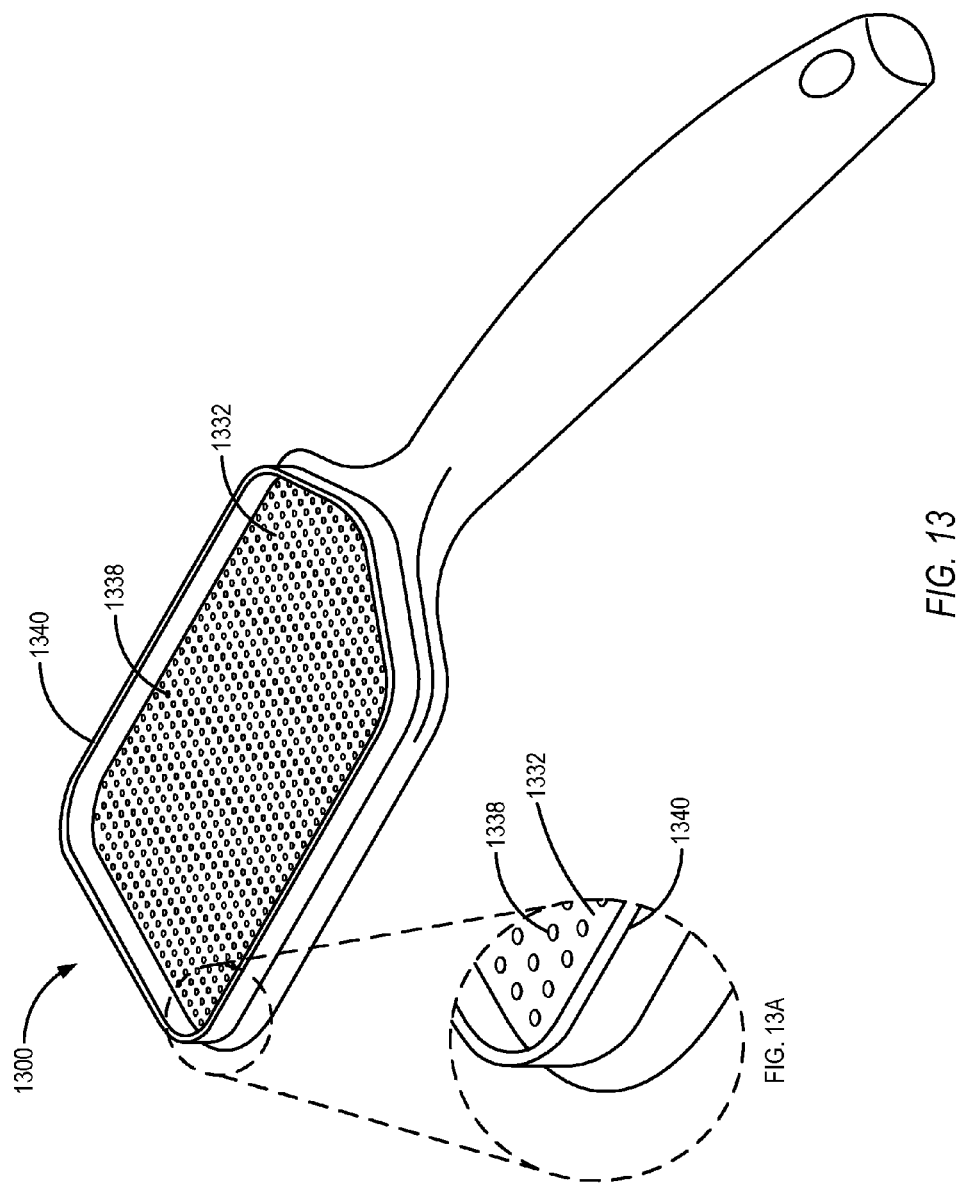
FIG. 13 is a perspective view of an oral delivery device, according to one embodiment of the present disclosure.
FIG. 13A is a close-up view of a delivery surface of the oral delivery device of FIG. 13.

FIG. 13 is a perspective view of another embodiment of an oral delivery device 1300 comprising a plurality of recesses 1338 disposed on the delivery surface 1332. The recesses 1338 may be configured to retain an oral care composition. As shown in FIG. 13A, a portion of the recesses 1338 may be substantially rounded. In some embodiments, the diameter of the substantially rounded portion may be about 2 mm. In other embodiments, the diameter of the substantially rounded portion may be greater than about 2 mm. In some embodiments, the diameter of the substantially rounded portion may be less than about 2 mm. Other sizes may also be used. For example, the diameter of the substantially rounded portion of the recesses 1338 may be between about 0.5 mm and about 5 mm. In other embodiments, the diameter of the substantially rounded portion of the recesses 1338 may be between about 1 mm and about 4 mm. In other embodiments, the diameter of the substantially rounded portion of the recesses 1338 may be between about 2 mm and about 3 mm. In other embodiments, the recesses 1338 may be substantially semi-spherical in shape.

As further shown in FIG. 13, the delivery surface 1332 may further include a lip 1340 disposed around at least a portion of an outer perimeter of the delivery surface 1332. The lip 1340 may be configured to aid in retaining an oral care composition on the delivery surface 1332. The lip 1340 may extend outwardly from the delivery surface 1332, for example in a direction that is substantially perpendicular to the delivery surface 1332. In some embodiments, the lip 1340 may be disposed around the entire outer perimeter of the delivery surface 1332. Further, the lip 1340 may be made of a soft, flexible material such that it will not harm or injure the tongue of an animal.

Figure 14:
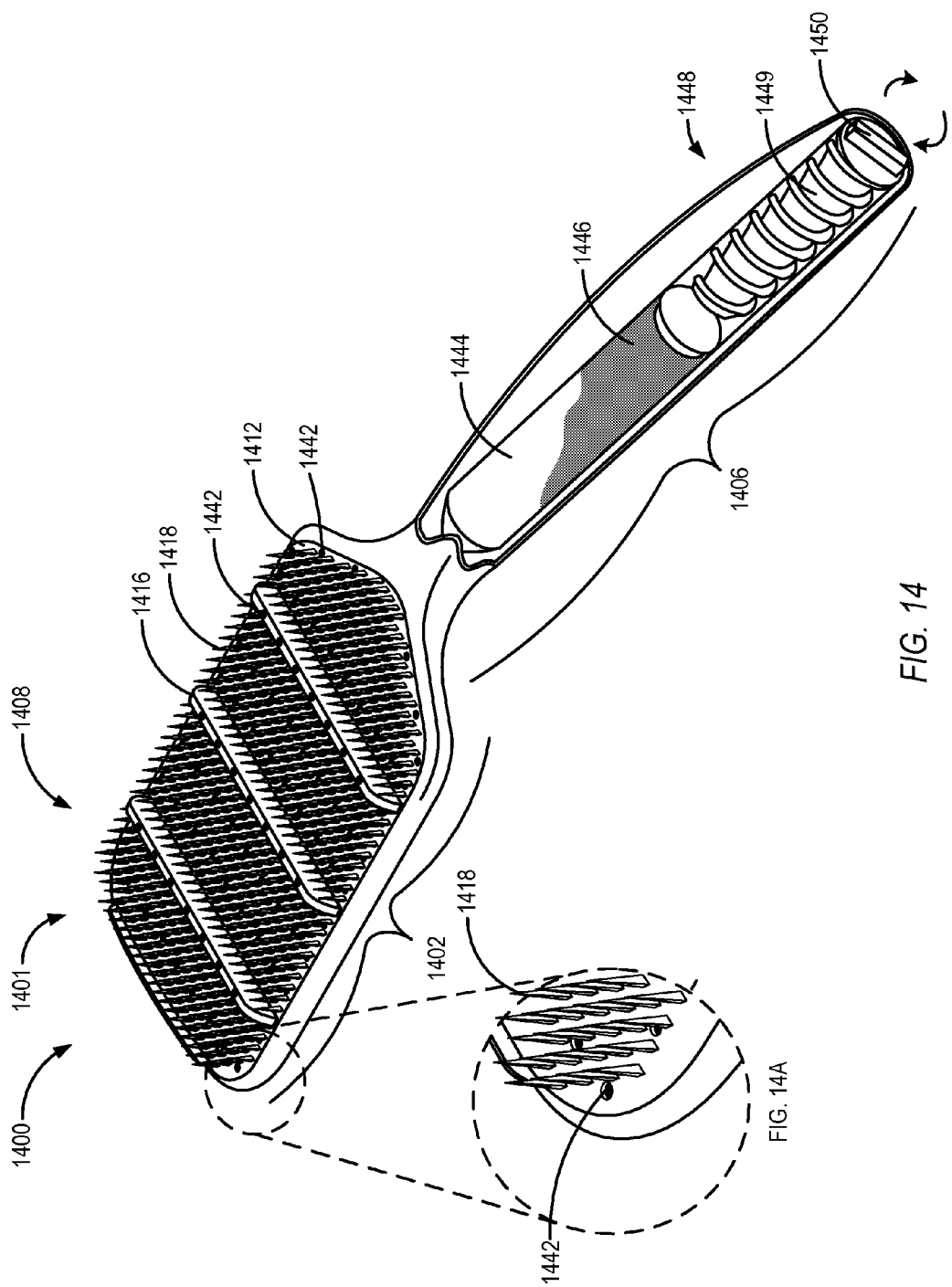
FIG. 14 is a perspective view of an oral care system, according to one embodiment of the present disclosure.

FIG. 14 is a perspective view of an oral care system 1401, according to one embodiment. The oral care system 1401 may comprise a tongue cleaning device 1400 and a dispensing mechanism 1448. The oral care system 1401 may further comprise an oral care composition 1446. As shown in FIG. 14, the tongue cleaning device 1400 may include a head 1402 that is coupled to a handle 1406. As further shown in FIG. 14, the head 1402 may include a plurality of bristles 1418 and a plurality of tongue scrapers 1416 disposed on a cleaning surface 1412.

In some embodiments, the handle 1406 of the tongue cleaning device 1400 may include a first compartment 1444 that is configured to house an oral care composition 1446. In some embodiments, the first compartment 1444 may include a reservoir that is configured to receive and contain an oral care composition 1446. In such embodiments, the oral care composition 1446 may be poured or otherwise loaded into the first compartment 1444. The oral care composition 1446 may be mixed, varied, and/or augmented/supplemented with optional and/or alternative supplements, medicaments, etc., according to a treatment regimen (e.g., such as a regimen recommended or prescribed by a veterinarian). For example, at a first treatment (e.g., on a first day) of a treatment regimen, the oral care composition 1446 may be prepared (e.g., combined or mixed) to comprise a given medicament, whereas at a second treatment (e.g., on the second day) of the treatment regimen the oral care composition 1446 may be prepared (e.g., combined or mixed) so as to not include the given medicament. The oral care composition 1446 at the second treatment may also include a supplement not included at the first treatment.

In other embodiments, the first compartment 1444 may be configured to receive a packet comprising an oral care composition 1446. For example, the first compartment 1444 may be configured to receive a tube or a pouch that may include the oral care composition 1446. Once the oral care composition 1446 has been dispensed from the tube or pouch, the empty tube or pouch may be removed from the oral delivery device 1400, and a new tube or packet may be inserted into the first compartment 1444. In some embodiments, the tube or pouch may be flexible and/or squeezable, such that compression of the pouch forces the oral care composition 1446 out an opening in the tube or pouch to dispense the oral care composition 1446.

In other embodiments, the handle 1406 may be configured such that a packet comprising an oral care composition 1446 may be inserted. The packet may be a pressurized can. In still other embodiments, a pressurized can comprising an oral care composition may be attached to, or otherwise coupled to, the oral care device. In some embodiments the pressurized can may be coupled in fluid communication with apertures on a surface of the head of the oral care device.

In some embodiments, the cleaning surface 1412 of the tongue cleaning device 1400 may further include one or more apertures 1442. The apertures 1442 may be disposed anywhere along the cleaning surface 1412. For example, as shown in FIG. 14A, the apertures 1442 may be disposed between and/or adjacent to one or more bristles 1418. In some embodiments, the apertures 1442 may be disposed on one or more tongue scrapers 1416. The apertures 1442 may further be disposed on one or more depressors, such as the depressors described above with regard to FIG. 2.

In some embodiments, the apertures 1442 may be spaced apart from one another at a distance of about 3 mm. In some embodiments, the apertures 1442 may be spaced apart from one another at a distance of between about 1.5 mm and about 5 mm. In yet other embodiments, the apertures 1442 may be spaced apart from one another at a distance of between about 2 mm and about 3.5 mm.

The apertures 1442 may be various sizes. For example, in some embodiments, the apertures 1442 may be about 0.5 mm in diameter. In other embodiments, the apertures 1442 may be between about 0.25 mm and about 2.5 mm in diameter. In yet other embodiments, the apertures 1442 may be between about 0.5 mm and about 1 mm in diameter. In yet other embodiments, the apertures 1442 may be between about 0.5 mm and about 5 mm in diameter. Other sizes may also be used.

The tongue cleaning device 1400 may be configured such that the apertures 1442 may extend through the cleaning surface 1412. The tongue cleaning device 1400 may further be configured such that the apertures 1442 may be in fluid communication with the first compartment 1444. Because the apertures 1442 are in fluid communication with the first compartment 1444, an oral care composition 1446 may be transferred from the first compartment 1444 to an outer surface of the cleaning surface 1412 via the apertures 1442.

The apertures 1442 may be in fluid communication with the first compartment 1444 in a variety of ways. In some embodiments, the apertures 1442 may be in fluid communication with the first compartment 1444 via one or more channels. As can be appreciated, the channels may be molded within the head 1402. In other embodiments, the apertures 1442 may be in fluid communication with the first compartment 1444 via one or more tubes. In yet other embodiments, the apertures 1442 may be in fluid communication with the first compartment 1444 via one or more cavities or voids.

The oral care system 1401 and/or the tongue cleaning device 1400 of FIG. 14 may further include a dispenser or a dispensing mechanism 1448. The dispenser 1448 may be integral with the tongue cleaning device 1400 and may be configured to transfer a portion of the oral care composition 1446 from the first compartment 1444 through the apertures 1442. A variety of dispensers 1448 may be used. In some embodiments, the dispenser 1448 may be a mechanical dispenser. As shown in the illustrated embodiment, for example, the dispenser 1448 may be a mechanical dispenser that comprises a threaded plunger 1449. In other embodiments, the dispenser 1448 may be an electrical dispenser. For example, the dispenser 1448 may include a small electric motor which may create positive pressure on an oral care composition 1446 housed within the first compartment 1444, or on an oral care composition within a tube or packet housed within the first compartment 1444, which may cause the oral composition 1446 to dispense through the apertures 1442.

The amount of oral care composition delivered from the first compartment 1444 and through the apertures 1442 may be metered or otherwise controlled within a range. Accordingly, a user (e.g., a pet owner) may be able to provide a proper dosage, for example of a medication or supplement, to an animal (e.g., a pet). In some embodiments, the amount of oral care composition 1446 delivered from the first compartment 1444 may be controlled by an actuator 1450. The actuator 1450 may be mechanical or electrical. In some embodiments, the actuator 1450 may comprise a button. In other embodiments, the actuator 1450 may comprise a twistable knob. By actuating the actuator, e.g. pushing the button or twisting the knob, a designated amount of oral care composition 1446 may be transferred from the first compartment 1444 through the apertures 1442 and to the surface of the tongue cleaning device 1400.

In some embodiments, the tongue cleaning device 1400 may further include a valve, which may be configured to control the passage of the oral care composition 1446 from the first compartment 1444. In another embodiment, each of the apertures 1442 may further include a valve, which may be configured to control the passage of oral care composition 1446 through the aperture 1442. Any variety of appropriate valves known in the art that are capable of controlling flow of liquid may be used.

Figures 15, 15A:
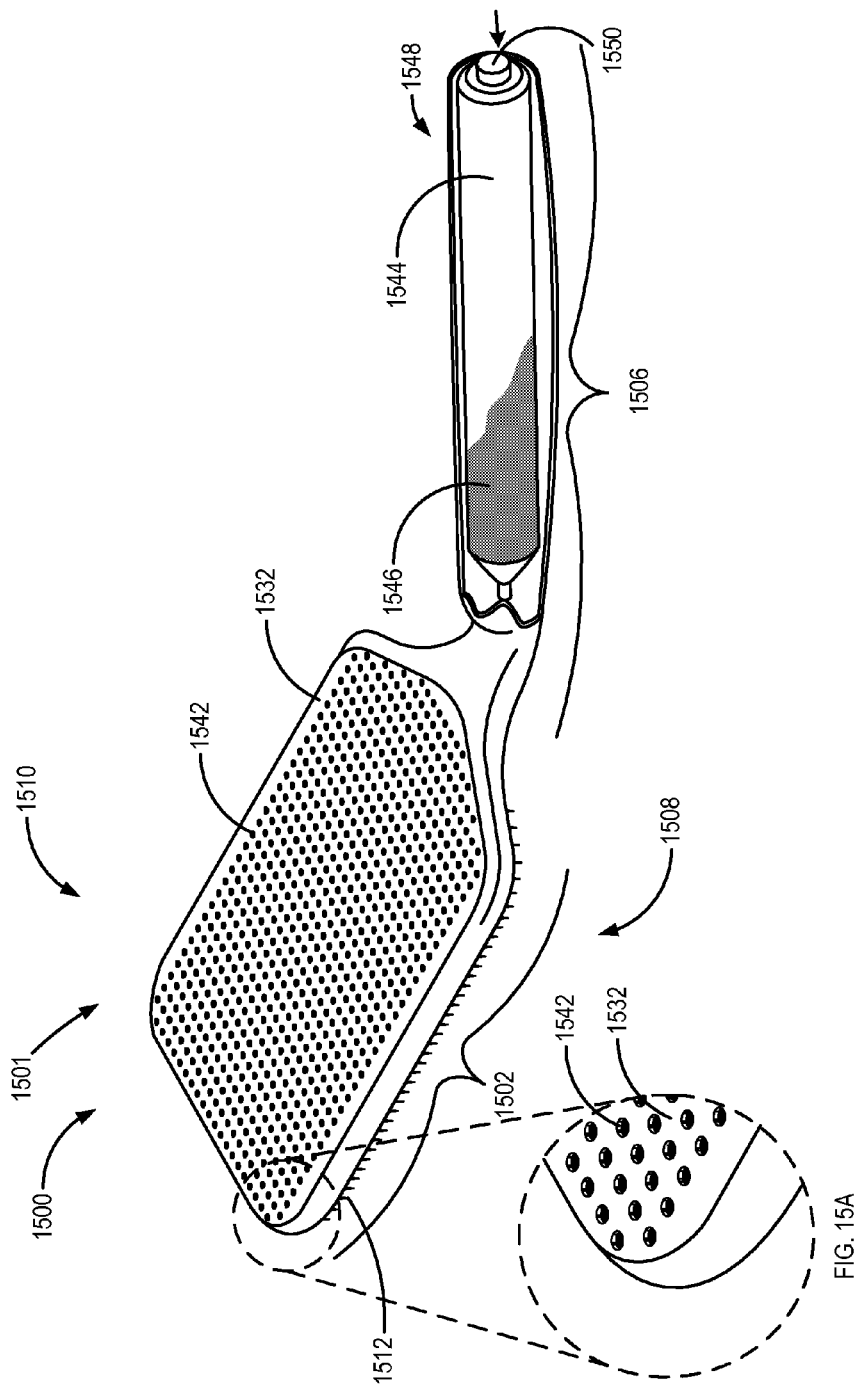
FIG. 15 is a perspective view of an oral care system, according to one embodiment of the present disclosure.
FIG. 15A is a close-up view of a portion of the oral care system of FIG. 15.

FIG. 15 is another embodiment of an oral care system 1501. As shown in FIG. 15, the oral care system 1501 may comprise an oral delivery device 1500 comprising a cleaning surface 1512 on a first side 1508, and a delivery surface 1532 on a second side 1510 of the device 1500. The oral care system 1501 may further comprise an oral care composition 1546. As shown in FIG. 15A, the second side 1510 of the device 1500 may include a delivery surface 1532 that includes one or more apertures 1542 that extend through the delivery surface 1532. Further, the apertures 1542 may be configured such that they are in fluid communication with a first compartment 1544 that is disposed inside the handle 1506.

The oral care system of FIG. 15 may further include a dispensing mechanism 1548 comprising an actuator 1550. As shown in FIG. 15, the actuator 1550 may comprise a button that is configured to dispense the oral care composition 1546 from the first compartment 1544 through the apertures 1542.

Figure 16:
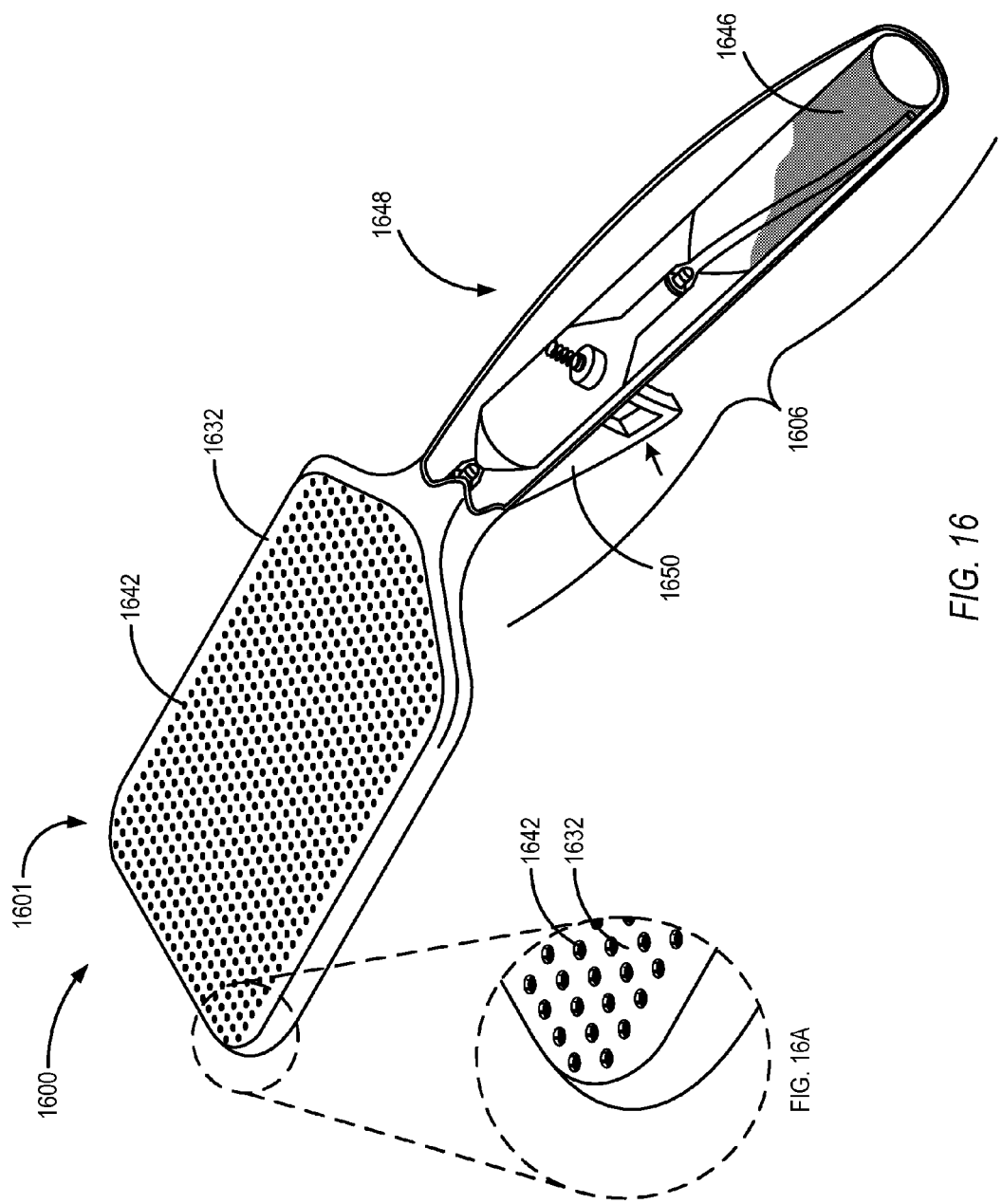
FIG. 16 is a perspective view of an oral care system, according to one embodiment of the present disclosure.

FIG. 16 is a perspective view of another embodiment of an oral care system 1601 comprising an oral delivery device 1600 and a dispenser mechanism 1648. The oral care system 1601 may further comprise an oral care composition 1646. As shown in FIG. 16A, the oral delivery device 1600 may include a delivery surface 1632 that may include one or more apertures 1642. The apertures 1642 may extend through the delivery surface 1632 and may be in fluid communication with a first compartment 1644 that is disposed within the handle 1606.

FIG. 16 further illustrates another example of a dispenser or dispensing mechanism 1648 that may be used in accordance with the present disclosure. As shown therein, the dispenser 1648 may include a mechanical dispenser and the actuator 1650 may include a depressible trigger. By depressing the trigger, or otherwise actuating the actuator 1650, the oral care composition 1646 may be transferred from the first compartment 1644 through the apertures 1642 in the delivery surface 1632.

Figure 17:
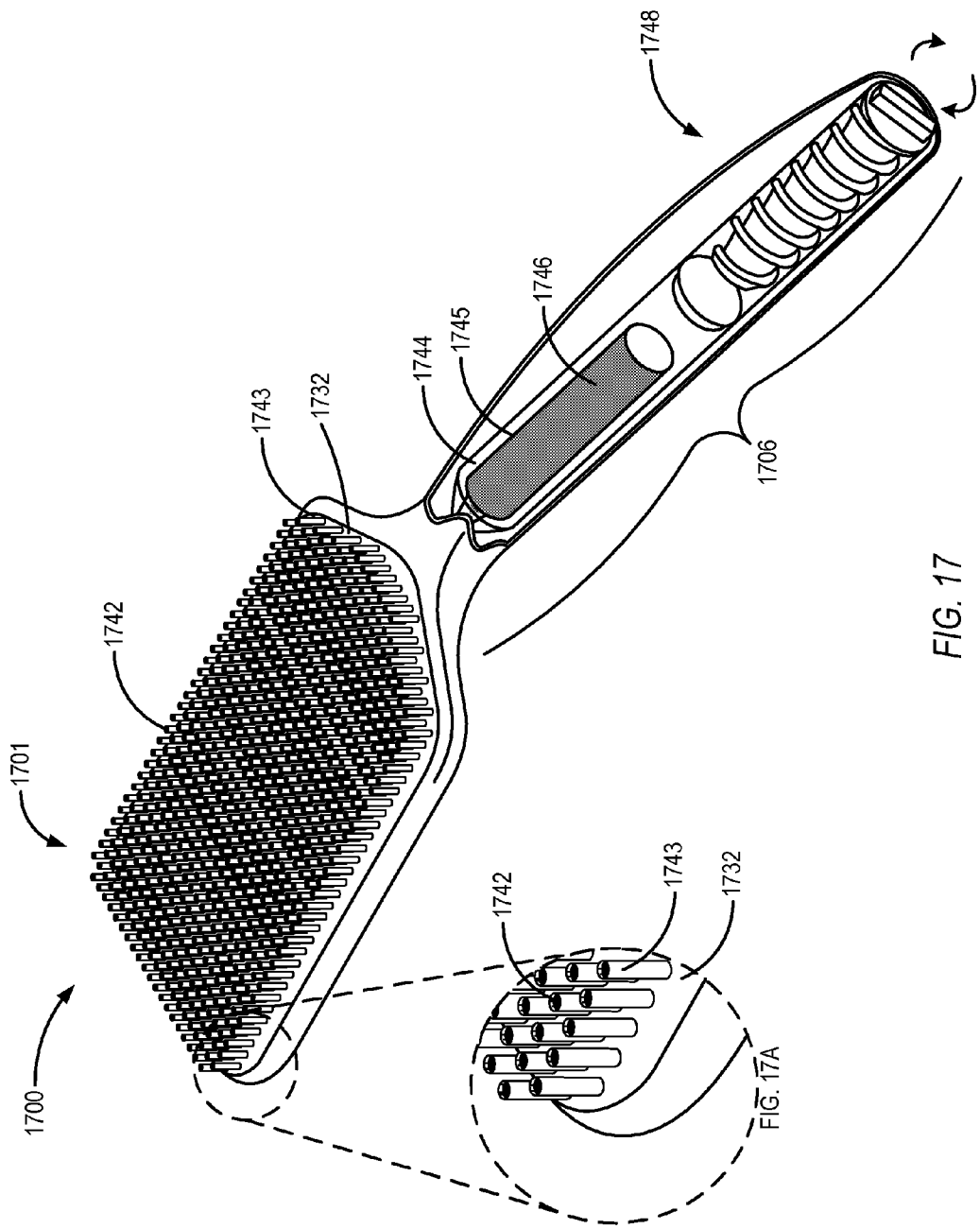
FIG. 17 is a perspective view of an oral care system, according to one embodiment of the present disclosure.

FIG. 17 is a perspective view of another embodiment of an oral care system 1701 comprising an oral delivery device 1700 and a dispensing mechanism 1748. The oral care system 1701 may further comprise an oral care composition 1746. As shown in FIG. 17, the oral delivery device 1700 may include one or more apertures 1742 disposed on the delivery surface 1732. As shown in FIG. 17A, the delivery surface 1732 may further include a plurality of elongated tubular members 1743 through which the apertures 1742 may extend. The tubular members 1743 may thus comprise a lumen that extends through the tubular members 1743 and through the delivery surface 1732 of the oral delivery device 1700. In some embodiments, the tubular members 1743 may comprise a soft, flexible material.

As further shown in FIG. 17, the first compartment 1744 disposed within the handle 1706 may be configured to receive a tube 1745 or other packet that contains an oral care composition 1746. The first compartment 1744 and/or tube 1745 (when positioned within the first compartment 1744) may be in fluid communication with the tubular member 1743.

Figure 18:
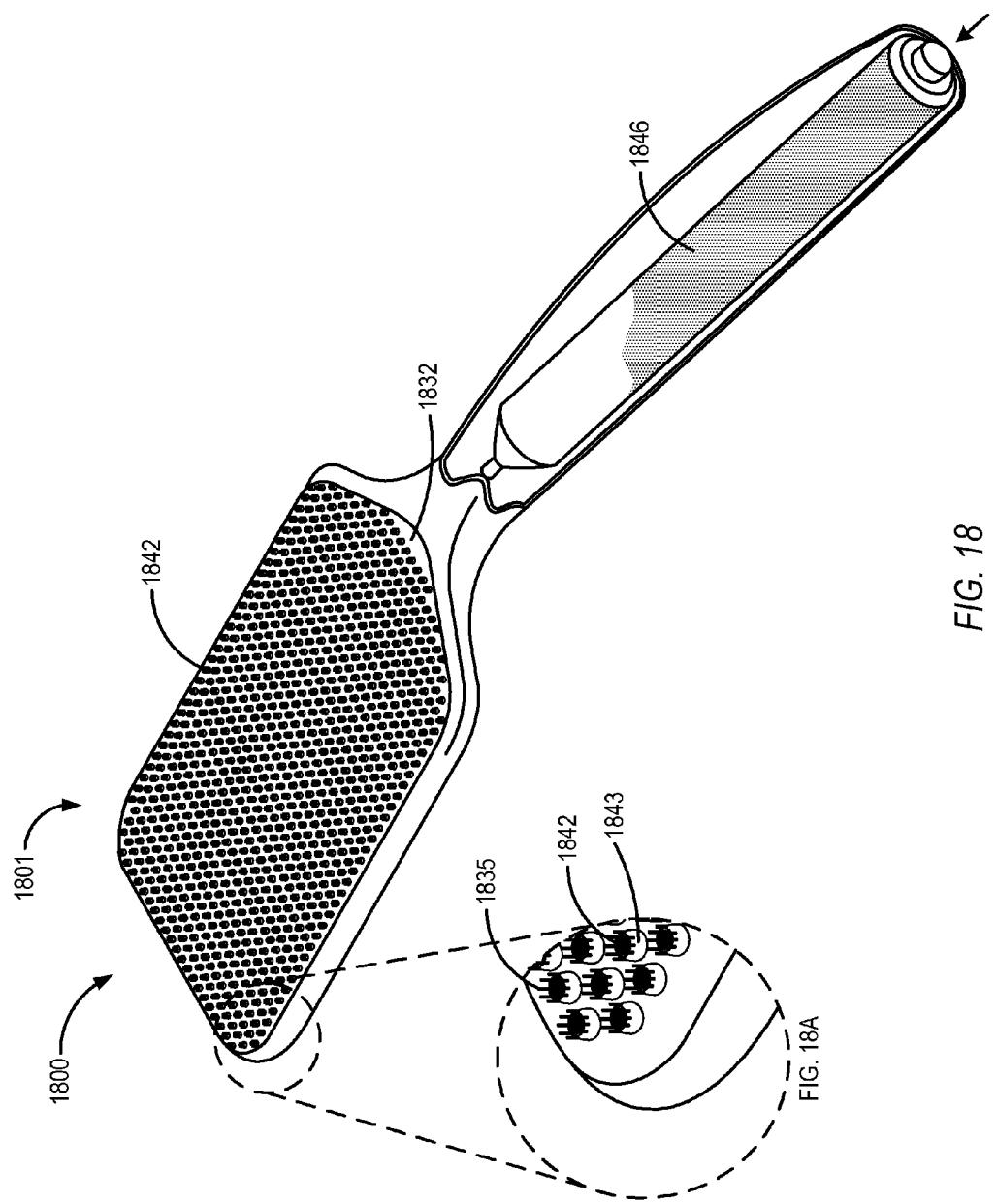
FIG. 18 is a perspective view of an oral care system, according to one embodiment of the present disclosure.

FIG. 18 is a perspective view of another embodiment of an oral care system 1801 comprising an oral delivery device 1800 having a delivery surface 1832 comprising one or more apertures 1842. The oral care system 1801 may further comprise an oral care composition 1846. The delivery surface 1832 may include a plurality of protrusions 1843 through which the apertures 1842 may extend. The protrusions 1843 may further comprise one or more elongated members 1835 that are disposed on the protrusions 1843. As further shown in FIG. 18, the elongated members 1843 may extend outwardly from the protrusions 1843 in a direction that is substantially perpendicular to the delivery surface 1832.

Figure 19:
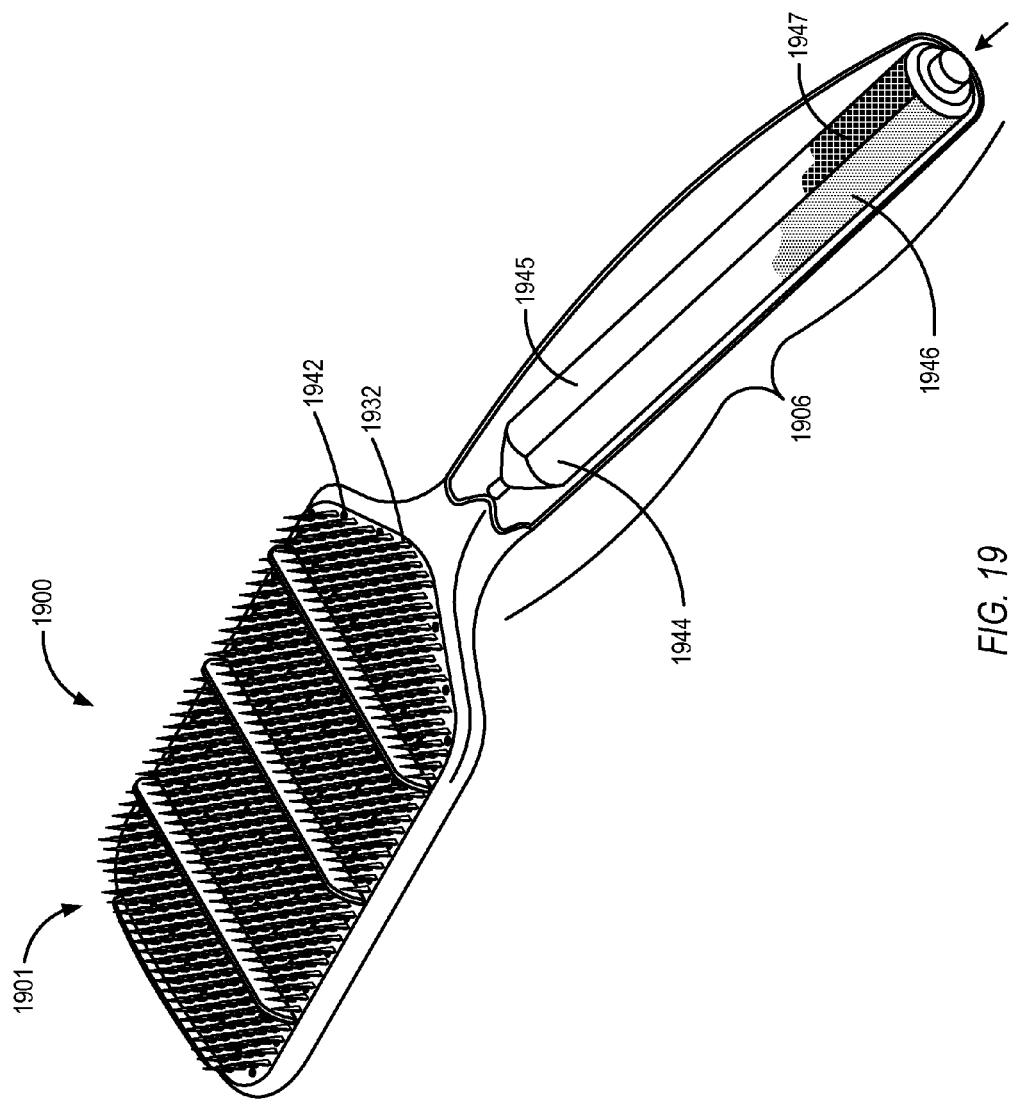
FIG. 19 is a perspective view of an oral care system, according to one embodiment of the present disclosure.

FIG. 19 is a perspective view of another embodiment of an oral care system 1901 comprising an oral delivery device 1900 having a delivery surface 1932 comprising one or more apertures 1942. The oral care system 1901 may also comprise a first oral care composition 1946. As further shown in FIG. 19, the apertures 1942 may be in fluid communication with a first compartment 1944 and a second compartment 1945 that are disposed within the handle 1906 of the oral delivery device 1900. The first compartment 1944 may be configured to house a first oral care composition 1946, and the second compartment 1945 may be configured to house a second oral care composition 1947. Thus various oral care compositions (e.g., 1946, 1947) may be kept separate from each other until they are delivered to the delivery surface 1932 of an oral delivery device 1900. For example, in some embodiments, the first oral care composition 1946 may include a probiotic (or a prebiotic) and the second oral care composition 1947 may include an incentivizing agent that may remain separate until they are dispensed and mixed on the delivery surface 1932 of the oral delivery device 1900.

As another example, the second oral care composition 1947 may comprise optional and/or alternative elements, supplements, and/or medicaments, etc. to vary, and/or augment/supplement the first oral care composition, for example, according to a treatment regimen (e.g., such as a regimen recommended or prescribed by a veterinarian). The first oral care composition 1946 may comprise a base solution that may be repeatedly and routinely administered. The second oral care composition 1947 may comprise an additional and/or alternative solution that may be varied from treatment to treatment according to a treatment regimen. For example, at a first treatment (e.g., on a first day) of a treatment regimen, the second oral care composition 1947 may be prepared to comprise a given medicament to supplement the first oral care composition 1946, whereas at a second treatment (e.g., on the second day) of the treatment regimen the second oral care composition 1947 may be prepared so as to not include the given medicament. The second oral care composition 1947 at the second treatment may also include a supplement not included at the first treatment.

In some embodiments, the second oral care composition is maintained separate from the first oral care composition because the second oral care composition may become "activated" (e.g., unstable) when combined with the first oral care composition. The first and second oral care compositions may be configured to create a chemical or other reaction when combined to produce an effect or benefit that may not be possible, for example, were certain elements in the first and second oral care compositions combined too far in advance of a time of treatment.

In other embodiments, the oral care system may include an oral care device having a cleaning surface on a first side of the device and a delivery surface on a second side of the device. Each of the cleaning surface and the delivery surface may include apertures that extend through the respective surfaces. The first compartment may be in fluid communication with apertures that extend through the cleaning surface, and the second compartment may be in fluid communication with apertures that extend through the delivery surface.

Figure 20:
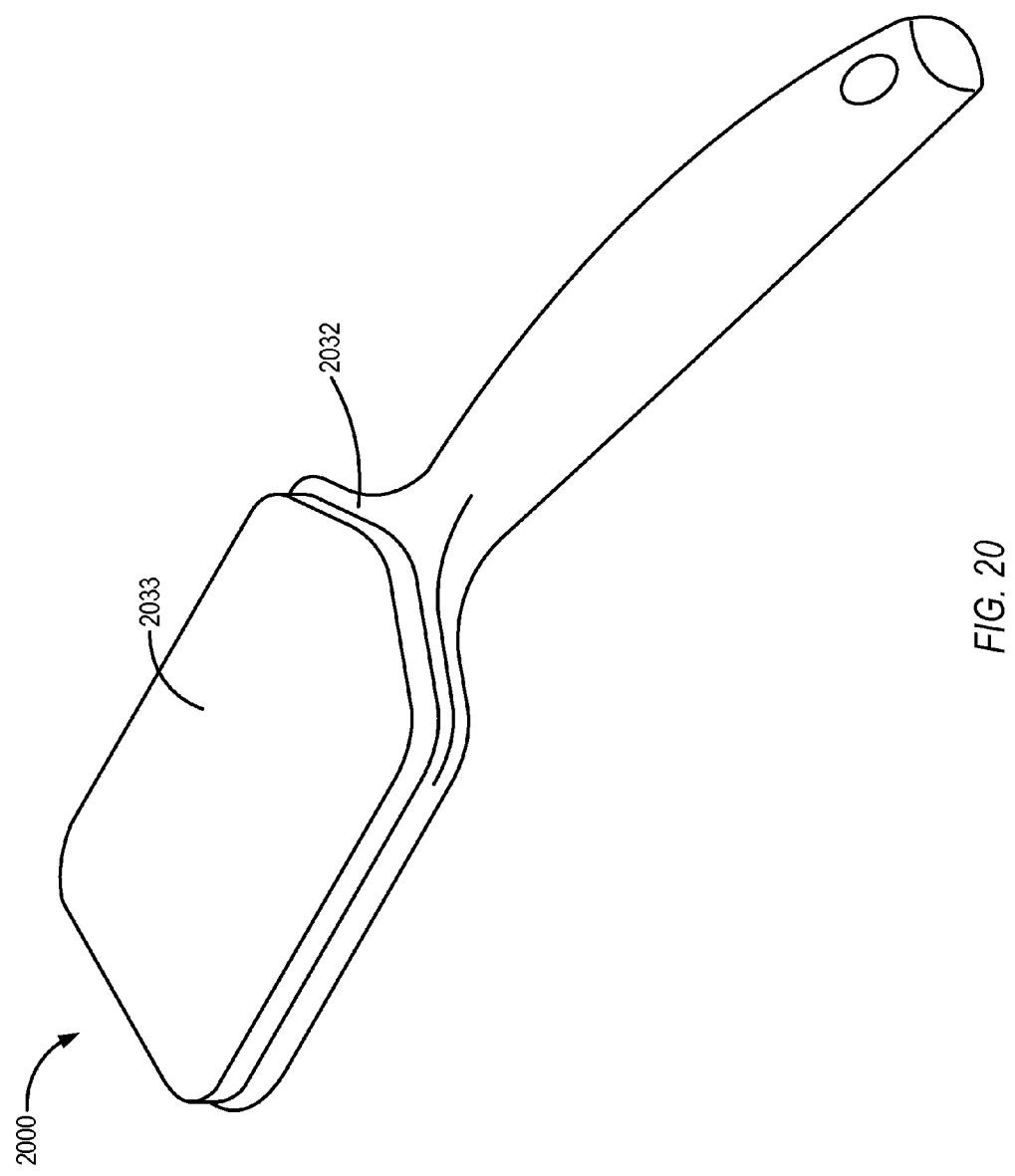
FIG. 20 is a perspective view of an oral delivery device, according to one embodiment of the present disclosure.

FIG. 20 is a perspective view of another embodiment of an oral delivery device 2000 according to the present disclosure. As shown in FIG. 20, an edible material 2033 may be disposed on the delivery surface 2032 of the delivery device 2000. The edible material 2033 may be made of a variety of materials. For example, in some embodiments, the edible material 2033 may comprise a starch. In other embodiments, the edible material 2033 may comprise a gelatin. In some embodiments, the edible material 2033 may comprise an oral care composition.

In some embodiments, the edible material 2033 may be a plurality of discrete sheets and/or layers. Each layer may be made of the same or different materials. The edible material 2033 may be integral with the delivery surface 2032. In other embodiments, the edible material 2033 may be configured such that is replaceable. For example, an edible material 2033 that is used or substantially used may be removed from the delivery surface 2032 and replaced with a new edible material 2033.

In some embodiments, the delivery surface may include a sponge or sponge-like material that may be configured to retain an oral care composition. The oral care composition may then be released from the sponge or sponge-like material as the animal licks the delivery surface. For example, pressure may be applied to the sponge or sponge-like material as the animal licks the delivery surface of the device. This increase in pressure may cause the oral care composition to be released from the sponge or sponge-like material for ingestion by the animal. The sponge or sponge-like material, however, may remain on the delivery surface and not be consumed by the animal.

Other embodiments of a cleaning and/or delivery device may be used, such as a mechanical cleaning and/or delivery devices having a motor configured to automatically vibrate the head of the device. Further the cleaning and/or delivery devices may be configured such that they are foldable for easy storage and transport.

Numerous sizes and configurations of cleaning and/or delivery devices are within the scope of this disclosure. By way of example, and not limitation, the current disclosure is applicable to cleaning and/or delivery devices that may be about 8 inches long. In some embodiments, the head of the cleaning and/or delivery device may be about 4 inches long and the handle of the device may be about 4 inches long. In some embodiments, the head may be configured to be larger than can be contained within a mouth of the animal such that the cleaning and/or delivery surface is configured to be contacted by the tongue while the head is positioned outside the animal's mouth and the animal's tongue protrudes out of the animal's mouth to lick the cleaning surface. In yet another embodiment, the head may be configured to be larger than can be swallowed by the animal. Accordingly, the size of the device may vary depending on the desired application; for example, the cleaning and/or delivery device may be configured to be relatively larger for large animals (e.g., a large dog), and the cleaning and/or delivery device may be configured to be relatively smaller for small animals (e.g., a small dog or cat).

Furthermore, it will be appreciated that many of the illustrated embodiments of oral cleaning devices disclosed herein may have analogous features. Accordingly, like features are designated with like reference numerals, with the leading digits incremented according to the figure number. (For instance, the oral care device that is designated "100" in FIGS. 1A-1C, and an analogous oral care device is designated as "200" in FIG. 2.) Relevant disclosure set forth above regarding similarly identified features thus may not be repeated for each embodiment. Moreover, specific features of embodiments of oral care devices and/or oral care systems may not be shown and/or identified by a reference numeral in all the drawings or specifically discussed in the written description pertaining to each drawing. However, such features may clearly be the same, or substantially the same, as features depicted in other embodiments and/or described with respect to such embodiments. Accordingly, the relevant descriptions of such features in one embodiment may apply equally to the features in other embodiments. Any suitable combination of the features, and variations of the same, described with respect to a given embodiment can be employed with other embodiments and vice versa.

Disclosed herein also are oral care compositions. As described above, oral care compositions may be used in conjunction with the oral care devices, including the cleaning and/or delivery devices, disclosed herein. In other embodiments, the oral care compositions may be used independently of the disclosed oral care devices.

An oral care composition may be in the form of foam, liquid, liquid spray, gel or paste. As used herein, the term "foam" indicates an emulsion-like two-phase system where the dispersed phase is gas or air as a collection of minute bubbles forming a frothy liquid substance. The term "foam" is also used as a verb to indicate formation or gathering of foam. In some embodiments, the oral care composition may be in the form of foam and comprise between about 80% to about 90% air and between about 5% to 20% liquid. In other embodiments, the oral care composition in foam form comprises about 90% air and about 10% liquid. The liquid may comprise water or a water-like solution. In some embodiments, an oral care composition in foam form may be desirable when the oral care composition includes incentivizing agent such as a flavoring agent.

In other embodiments, an oral care composition in gel or paste form may be desirable when the oral care composition includes an incentivizing agent that includes food-type substances or mixtures thereof. Examples of gel or paste forms may include, but are not limited to, gravy or gravy-like mixtures. An oral care composition in gel or paste form may include water or a water-like solution.

In some embodiments, the bristles of the tongue cleaning device may be configured for use in a water or water-like environment. In such circumstances, water, or a water-like solution, can function as a lubricant to allow the bristles to more easily bend and weave to access the small openings on the surface of the animal's tongue. The oral care composition may be configured to rapidly reduce to a water-like solution in the animal's mouth, which may enhance the action of the bristles. Moreover, the water-like solution that results from reduction of the oral care composition may function as a solvent that dissolves the bacteria, waste materials, food debris, and other materials that are loosened and dislodged by the bristles, allowing easier ingestion or discharge from the animal's mouth. In some embodiments, the oral care composition is configured to remain among the bristles of the tongue cleaning device so that an animal will continue to lick the tongue cleaning device until the animal's tongue is clean. In some embodiments, the oral care composition is configured to remain among the bristles of the tongue cleaning device while an animal licks the tongue cleaning device for between about 30 to about 60 seconds.

The consistency of the oral care composition can be temporarily affixed to a tongue cleaning device long enough to allow the animal to lick the tongue cleaning surface thereby transferring the oral care composition to the surface of the animal's tongue. Once on the surface of the animal's tongue, the oral care composition can be rapidly reduced to a water-like solution, having desirable characteristics for cleaning the grooves, fissures, indentations, ducts, and other small openings of the animal's tongue.

The oral care composition may impart benefits to the animal's oral cavity. For example, the oral care composition may be delivered from the animal's tongue to the animal's oral cavity. The oral care composition may then be retained in the animal's oral cavity for a prolonged amount of time (e.g., 4, 5, or 6 or more hours). During this time, the oral care composition may impart one or more benefits to the surfaces within the animal's oral cavity such as the animal's teeth, tongue, and gums. For example, the oral care composition may be used to treat tartar, gingivitis, plaque and other detriments to the animal's oral health.

The oral care compositions may include a variety of substances. For example, the oral care composition may include an incentivizing agent to entice an animal to lick the disclosed cleaning and/or delivery devices. The incentivizing agent may, for example, include a flavoring that is agreeable to an animal that can entice the animal to lick the cleaning and/or deliver device and may leave a pleasant odor in the animal's mouth. The incentivizing agent may also cause the animal to regard the oral composition as a treat or otherwise associate the incentivizing agent with pleasure and enjoyment. In some embodiments, the incentivizing agent may include a flavoring that may be agreeable to an animal such as, for example, a dog or a cat. In some embodiments, the incentivizing agent may include a meat flavoring, such as, for example, poultry (e.g., chicken or turkey), beef, pork (e.g., bacon), lamb, or fish flavoring.

In some embodiments, the incentivizing agent may include a flavoring comprising a natural or artificial flavoring agent that is configured to produce a desired flavor. In other embodiments, the incentivizing agent may include a flavoring comprising a food-type substance that includes natural flavors, such as for example, poultry, beef, pork (e.g., bacon), lamb, or fish food-type substances or mixtures thereof. Additional flavorings that are agreeable to an animal may be used, such as vegetable flavorings and coconut oil.

In addition to being configured to entice the animal to lick the cleaning and/or delivery devices, the oral care composition may include additional substances that can penetrate the small openings of the surface of the animal's tongue and provide a lubricant that can enhance dislodgment of bacteria, waste materials, food debris, and other materials.

For example, the oral care composition, according to an embodiment of the present disclosure, can also function as a delivery medium for an antimicrobial substance. The antimicrobial substance can kill bacteria on the animal's tongue, which facilitates dislodgment of bacteria during cleaning and further enhances efficacy of the tongue cleaning device. The antimicrobial substance also helps prevent re-growth of bacteria, thereby prolonging the effects of the tongue cleaning. The antimicrobial substance may include substances to target aerobes and/or anaerobes.

The oral care composition, according to an embodiment of the present disclosure, may include a foaming agent, a sweetener, a surfactant, a flavoring (e.g., a flavoring agent and/or a food-type substance), a scented agent, an antimicrobial agent, an anti-bacterial agent, an anti-oxidant, an anti-caries agent, a coloring agent, a thickening agent, a preservative, a disinfectant, water and a pH-adjusting agent. A combination and/or blend of these constituents may be used for the oral care composition, and a single ingredient may act in multiple modes.

In an embodiment, the oral care composition may include xylitol, a sweetener with antimicrobial properties. In another embodiment, the oral care composition may include a sweetener, which may include stevia. In one embodiment, the sweetener may be present in a weight percentage of between about 0.1 to about 10 percent.

In an embodiment, the oral care composition may include at least one surfactant, which may be ionic or non-ionic. For example, sodium lauryl sulfate is an ionic surfactant and polysorbate 80 is a non-ionic surfactant. Other examples of surfactants include polysorbate 20, PEG-40 hydrogenated castor oil, cocamidopropyl betaine, sodium lauroyl sarcosinate, and poloxamer 407. The surfactant may also be a detergent and/or an emulsifying agent. The surfactant may include cetyl hydroxyethylcellulose. The surfactant may be present in a weight percentage of between about 0.1 to about 2.5 percent.

In an embodiment, the oral care composition may include at least one foaming agent. The foaming agent may be, but is not necessarily, a surfactant. Exemplary foaming agents include cellulose gum and sorbitol. In one embodiment, a foaming agent may be present in a weight percentage of between about 0.1 to about 4.0 percent. Further, the oral care composition may have a range of viscosities in its foamed state. The oral care composition also may have a range of densities in its foamed state.

In an embodiment, the oral care composition may include at least one antimicrobial agent, anti-bacterial agent, anti-oxidant, or anti-caries agent. For example, a licorice extract, a biologically active enzyme or group of enzymes (such as Selectobac™ or Salzyme™), lutein, aloe vera, or cetylpyridinium chloride may be used. A chlorite or peroxide may be included to target anaerobic bacteria. At least one antimicrobial agent, anti-bacterial agent, anti-oxidant, or anti-caries agent may be present in a weight percentage of between about 0.01 to about 1.0 percent each.

In an embodiment, the group of enzymes may be selected from at least one of lysozyme, amylase, amylglucosidase, glucoxidase, peptizyme, papain and lactoferrin. In another embodiment, the group of enzymes may be Orazyme™.

Enzymes may be added to the oral care composition to aid in the formation and/or growth of bacterial cultures that do not produce bad breath or disease, or to reduce the formation and/or growth of bacteria that do produce bad breath or disease. Use of the inventive oral care composition may therefore control an animal's bad breath.

In an embodiment, the oral care composition may include a scented agent, for example, poultry, beef, pork, fish, and other scents. The scented agent may be organic. The scented agent may be present in a weight percentage of between about 0.01 to about 1.0 percent.

In an embodiment, the oral care composition may comprise a pH-adjusting agent. For example, sodium hydroxide, sodium hydrogen carbonate, or sodium phosphate may be used to adjust the pH of the agent. Other pH adjusting agents may also be used, including phosphoric acid, hydrochloric acid, and/or sulfuric acid. The pH adjusting agent may change the pH to a basic or acidic pH. The pH-adjusting agent may be present in a weight percentage of between about 0.02 to about 4.0 percent.

In an embodiment, the oral care composition may include a thickening agent, for example, glycerol (glycerin), cellulose gum, propanediol, or sorbitol. The thickening agent may be present in a weight percentage of between about 0.01 to about 0.8 percent.

In an embodiment, the oral care composition may include a preservative, for example, ethanol, or benzoic acid. The preservative may be present in a weight percentage of between about 1.0 to about 9.0 percent.

In an embodiment, the oral care composition may include a disinfectant, for example, an alcohol. The disinfectant may be present in a weight percentage of between about 0.5 to about 9.0 percent.

In an embodiment, the oral care composition may include a coloring agent, for example, FD & C Blue #1. The coloring agent may be present in a weight percentage of between about 0.001 to about 0.08 percent.

In an embodiment, the oral care composition may include water. In one embodiment, water may be present in a weight percentage of between about 50 to about 95 percent.

In an embodiment, the oral care composition may include a vitamin, mineral, dietary, and/or nutritive or nutritional supplement. The supplement may include a natural or artificial supplement. The supplement may be water or oil based. The oral care composition may include a supplement that is configured to improve the health or well-being of the animal, such as supplements that benefit the animal's hair, fur, skin, feet, eyes, vital organs, joints, bones, etc. For example, the supplement may include nutritional compounds sometimes referred to as neutraceuticals, which can be a source of essential nutritional elements. These compounds may include, for example, lutein (for eye health) or lycopene (for prostrate health). Other examples of supplements in an oral care composition may include zinc gluconate, coconut oil, omega 3 supplement, and/or glucosamine. Other vitamin, mineral, dietary, and/or nutritional supplements may be used. The supplement may be present in a weight percentage of between about 0.001 to about 0.3 percent.

In an embodiment, the oral care composition may include a probiotic agent. For example, the oral care composition may include *Lactobacillus gasserit, Bifidobacterium bifidum* and/or *Bifidobacterium longum*. Other probiotic agents comprising various microorganisms may also be used. The probiotic agent may also be housed in a vial which may be refrigerated until prior to use. Prior to use, the vial may be broken, or otherwise opened, and the probiotic agent may be mixed or otherwise combined with an incentivizing agent and delivered to an animal using the disclosed cleaning and/or delivery device. In some embodiments, the oral care composition may also include one or more enzymes that promote the growth of healthy bacteria in the animal's oral cavity. In some embodiments, the oral care composition may include a prebiotic agent that is activated when combined with another substance.

In an embodiment, the oral care composition may include a substance that is configured to disrupt the buildup of tarter and plaque on one or more teeth of an animal. In another embodiment, the oral care composition may include a substance that is configured to treat the buildup of tarter and plaque on one or more teeth of an animal. For example, the oral care composition may include chlorhexidine and/or chlorohexane. The oral care composition may be an antiplaque material. The oral care composition may further include natural substances that may disrupt and/or treat the buildup of tarter and plaque including grapefruit seed extract and/or grape seed extract.

In an embodiment, the oral care composition may include a medicament or other treatment agent for treating a disease, lines, or other health condition of an animal. For example, the oral care composition may include a medicament or treatment agent comprising chondroitin that may be beneficial to an animal's joints. In another embodiment, the oral care composition may include a medicament or treatment agent useful for treating diseases, parasites, and/or worms. For example, the oral care composition may include piperazine. The oral care composition may also include an antibiotic. The oral care composition may also include a mold and/or yeast inhibitor such as calcium propionate and/or potassium sorbate.

In an embodiment, the oral care composition may include a substantive active ingredient that may bind to the oral soft tissue (e.g., tongue) of the animal and then disperse over time releasing a beneficial action in the oral cavity, including teeth, gums, and tongue, of the animal. In some embodiments, the substantive active ingredient comprises antimicrobials like chlorhexidine and/or chlorhexane that can kill gingivitis bacteria. In other embodiments, the substantive active ingredient may comprise polyphenols, like natural tea extract, and pyro phosphates that may serve as an antioxidant and fight bacteria.

In an embodiment, the oral care composition includes water, at least one foaming agent, at least one sweetener, at least one flavoring (e.g., flavoring agent and/or food-like substance), at least one antimicrobial agent comprising a biologically active enzyme, at least one preservative, and at least one coloring agent.

In an embodiment, the biologically active enzyme comprises at least one of lysozyme, amylase, amylglucosidase, glucoxidase, peptizyme, papain and lactoferrin.

The biologically active enzyme may comprise a group of enzymes, or be a mixture or combination of enzymes, including mixtures or combinations of lysozyme, amylase, amylglucosidase, glucoxidase, peptizyme, papain and lactoferrin. As can be appreciated, other acceptable enzymes may also be used according to the present disclosure.

In another embodiment, the oral care composition may include water, denatured ethanol, xylitol, stevia, sodium lauroyl sarcosinate, glycerin, polysorbate 80, cetyl hydroxyethylcellulose, a flavoring (e.g., poultry, beef, pork, or fish flavoring) that is agreeable to a desired animal (e.g., dog or cat), and sodium hydroxide. The flavoring may comprise a natural or artificial flavoring agent and/or a food-type substance.

In yet another embodiment, the oral care composition may include water, sorbitol, xylitol, propanediol, cellulose gum, poloxamer 407, benzoic acid, Selectobac™, a flavoring (e.g., poultry, beef, pork, or fish flavoring) that is agreeable to a desired animal (e.g., dog or cat), Salzyme™, aloe vera, sodium phosphate and zinc gluconate. The flavoring may include a natural or artificial flavoring agent and/or a food-type substance.

Methods of using oral care devices and oral care compositions for providing care to an animal are also disclosed herein.

Figure 21:
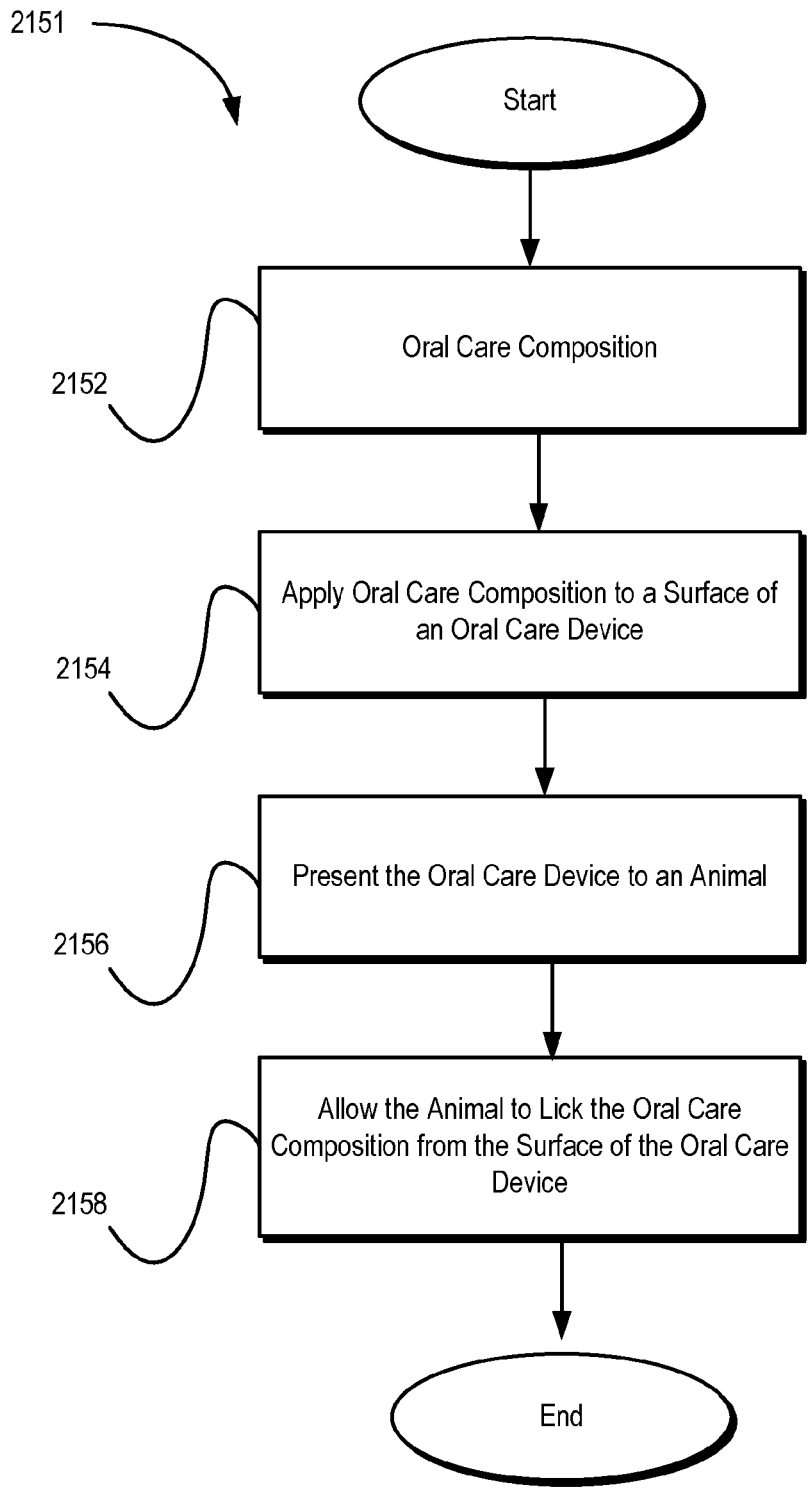
FIG. 21 is a flow diagram of a method of using an oral care device, according to one embodiment of the present disclosure.

For example, FIG. 21 is flow diagram 2151 of a method, according to an embodiment of the present disclosure. A user obtains 2152 an oral care composition, which may include an incentivizing agent. The oral care composition can be dispensed or otherwise applied 2154 to a surface, such as the cleaning surface or the delivery surface, of an oral care device (e.g., to the bristles of a tongue brush and/or a tongue scraper), such as the tongue cleaning device 100 of FIGS. 1A-1C. The oral care composition may be dispensed or otherwise applied to the surface of the device in a manner to produce a foam, or other suitable form, on the surface of the device, prior to the oral care device and oral care composition being presented to the animal. For example, the oral care composition can be dispensed using a pump mechanism configured to pump the solution from a bottle. The pump mechanism may further provide an agitation to concurrently foam the oral care composition as it is applied to the oral care device. As another example, the oral care composition may be dispensed from a pressurized can, similar to shaving cream or whipped cream. As can be appreciated, other methods of dispensing the oral care composition are possible such as using a Venturi system to draw foaming oral care composition from a storage container to mix with a stream of water and form a foam during application.

With the oral care composition appropriately applied 2154 on the surface of the oral care device, the user may present 2156 the oral care device to an animal. The user may then allow 2158 the animal to lick the oral care composition from the surface of the oral care device.

In the case of an oral cleaning device, such as a tongue cleaning device, the licking action of the animal results in the bristles and/or tongue scrapers coming into contact with the tongue to clean the animal's tongue. The bristles and tongue scrapers may dislodge or loosen material from the surface of the animal's tongue. Moreover, the licking of the tongue cleaning device can function to work the incentivizing agent into the grooves, fissures, indentations, ducts, and other small openings on the surface of the animal's tongue. The oral care composition may be quickly reduced to a water-like solution that functions to lubricate and improve the cleaning efficacy of the bristles of the tongue cleaning device and to dissolve the bacteria, waste material, food debris, and other materials loosened and dislodged from the surface of the tongue into a liquid solution. In some embodiments, the user may allow the animal to lick the tongue cleaning device for about 30 seconds to about 60 seconds. In addition to allowing the animal to lick the tongue cleaning device, the user may optionally brush and/or scrape the surface of the animal's tongue if desired. The cleaning surface may limit the ability of the animal to entirely consume the oral care composition, such that a perpetual incentive remains on the cleaning surface to motivate the animal to lick the cleaning surface.

In the case of an oral delivery device, the animal may lick the delivery surface an entirely consume the oral care composition. By allowing the animal to entirely consume a deposited amount of an oral care composition, the delivery surface enables providing correct dosing of, for example, medications, treatment compositions, and dietary and nutritional supplements.

In some embodiments, the method may further include removing the oral care device from the presence of the animal to avoid the animal chewing the device. In some embodiments, after presenting the device to the animal, the user may desire to wash the device in water or a water solution. The user may then dry the device until further use.

A method for cleaning a tongue of an animal may comprise: grasping a tongue cleaning device; dispensing an oral care composition onto an outer surface of a cleaning surface of the tongue cleaning device; and presenting the tongue cleaning device to the animal to allow the animal to lick the oral care composition on the cleaning surface, whereby the licking action of the animal dislodges and loosens material on the surface of the tongue of the animal.

The method for cleaning a tongue of an animal may include grasping a tongue cleaning device comprising: a handle at a proximal end; and a head at a distal end and coupled to the handle such that the head is angled relative to the handle, wherein the head includes a cleaning surface on a first side, the cleaning surface being configured to clean the tongue of the animal as the animal licks the cleaning surface, dispensing an oral care composition onto an outer surface of the cleaning surface of the tongue cleaning device; and presenting the tongue cleaning device to an animal to allow the animal to lick the oral care composition on the cleaning surface, whereby the licking action of the animal dislodges and loosens material on the surface of the tongue of the animal.

In some embodiments, the cleaning surface of the grasped cleaning device may include a first tongue scraper disposed on the cleaning surface; a first plurality of bristles that are tapered to a point, the first plurality of bristles being disposed on the cleaning surface adjacent the first tongue scraper and positioned toward a distal end of the head relative to the first tongue scraper, wherein a portion of one or more bristles of the first plurality of bristles extends towards the distal end of the head; a second tongue scraper disposed on the cleaning surface adjacent the first plurality of bristles and toward the distal end of the head relative to the first plurality of bristles; and a second plurality of bristles that are tapered to a point, the second plurality of bristles being disposed on the cleaning surface adjacent the second tongue scraper and toward the distal end of the head relative to the second tongue scraper, wherein a portion of one or more bristles of the second plurality of bristles extends towards the distal end of the head.

In some embodiments, the step of dispensing the oral care composition onto the outer surface of the cleaning surface may include actuating a dispenser that is configured to transfer the oral care composition from a first compartment disposed within the handle through one or more apertures disposed on the cleaning surface to the outer surface of the cleaning surface. In other embodiments, the step of dispensing the oral care composition onto the outer surface of the cleaning surface may include operating a pump mechanism configured to pump the oral care composition from a bottle.

In some methods, the oral care composition may include one or more of the following: water, a foaming agent, a scenting agent, a sweetener, a flavoring, a preservative, and a coloring agent. In some methods, the oral care composition may further include one or more of the following: an antimicrobial agent, a nutritional supplement, a probiotic, a prebiotic, and a medicament.

A method of administering an oral care composition to an animal may comprise: obtaining a tongue cleaning device comprising: a handle at a proximal end; and a head at a distal end and coupled to the handle such that the head is angled relative to the handle, wherein the head comprises a first side and a second side, the first side having a cleaning surface comprising: a first tongue scraper disposed on the cleaning surface; a first plurality of bristles that are tapered to a point, the first plurality of bristles being disposed on the cleaning surface adjacent the first tongue scraper and positioned toward a distal end of the head relative to the first tongue scraper, wherein a portion of one or more bristles of the first plurality of bristles extends towards the distal end of the head; a second tongue scraper disposed on the cleaning surface adjacent the first plurality of bristles and toward the distal end of the head relative to the first plurality of bristles; and a second plurality of bristles that are tapered to a point, the second plurality of bristles being disposed on the cleaning surface adjacent the second tongue scraper and toward the distal end of the head relative to the second tongue scraper, wherein a portion of one or more bristles of the second plurality of bristles extends towards the distal end of the head, obtaining an oral care composition; dispensing the oral care composition onto an outer surface of the cleaning surface; and presenting the tongue cleaning device to an animal to allow the animal to lick the cleaning surface.

In some methods, dispensing the oral care composition onto the outer surface of the cleaning surface comprises actuating a dispenser that is configured to transfer the oral care composition from a first compartment through one or more apertures disposed on the cleaning surface to the outer surface of the cleaning surface.

In some methods, the oral care composition may comprise a medicament. In other methods, the oral care composition may comprise a probiotic agent. In other methods, the oral care composition may comprise an antimicrobial agent. In other methods, the oral care composition may comprise a substance that is configured to disrupt the buildup of tarter and plaque on one or more teeth of the animal, or a substance that is configured to treat the buildup of tarter and plaque on one or more teeth of the animal. In yet other methods, the oral care composition may comprise a nutritional supplement, such as a natural or artificial supplement. The supplement may be configured to improve the health of the animal.

Another method of administering an oral care composition to an animal may comprise: obtaining an oral care composition; obtaining an oral delivery device comprising: a handle at a proximal end; and a head at a distal end and coupled to the handle such that the head is angled relative to the handle, wherein the head comprises a first side having a delivery surface configured to retain the oral care composition when dispensed thereon; wherein the head is configured to be larger than can be contained within a mouth of the animal such that the delivery surface is configured to be contacted by the tongue of the animal while the head is positioned outside of the mouth of the animal; dispensing the oral care composition onto an outer surface of the delivery surface; and presenting the tongue cleaning device to an animal to allow the animal to lick the delivery surface.

In some methods, the delivery surface of the delivery device further comprises a plurality of protrusions that are disposed on the delivery surface, the plurality of protrusions extending outwardly from the delivery surface in a direction that is substantially perpendicular to the delivery surface, wherein one or more protrusions of the plurality of protrusions are configured to retain a portion of the oral care composition dispensed onto the delivery surface.

The present disclosure further discloses a method of administering an oral care composition to an animal, comprising: obtaining an oral care composition; obtaining an oral delivery device comprising: a handle at a proximal end, wherein the handle comprises a first compartment that is configured to house the oral care composition; a head at a distal end and coupled to the handle such that the head is angled relative to the handle, wherein the head comprises a first side having a delivery surface and a second side, wherein the first side comprises a plurality of apertures that are in fluid communication with the first compartment; a dispenser configured to transfer an oral care composition onto an outer surface of the delivery surface; dispensing the oral care composition onto an outer surface of the delivery surface; and presenting the tongue cleaning device to an animal to allow the animal to lick the delivery surface.

In some methods, dispensing the oral care composition onto the outer surface of the delivery surface comprises actuating the dispenser that is configured to transfer the oral care composition from the first compartment through the plurality of apertures to the outer surface of the delivery surface.

Figure 22:
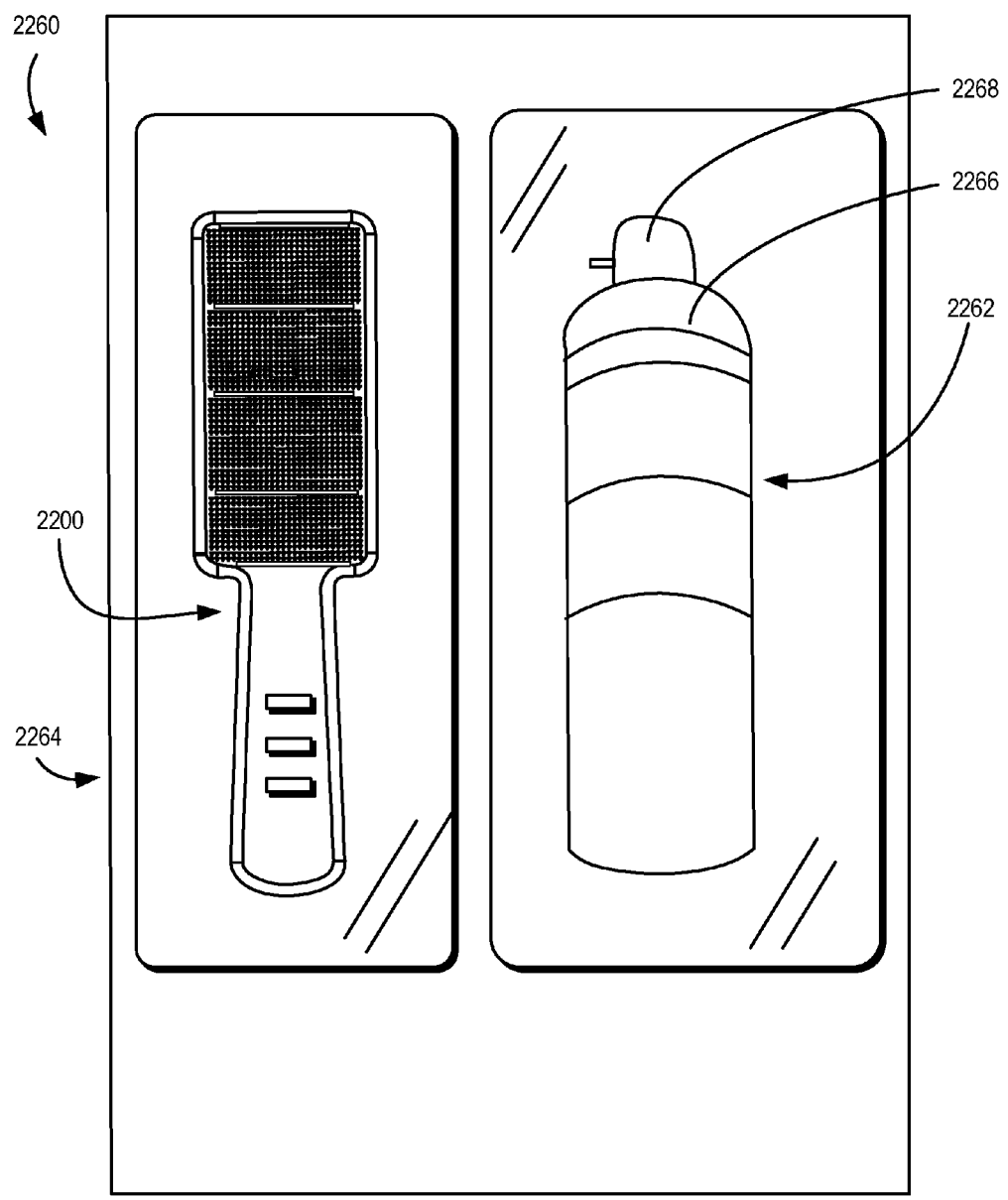
FIG. 22 is a kit for cleaning the tongue of an animal, according to one embodiment of the present disclosure.

Further disclosed here are kits for cleaning the tongue of an animal and delivering oral compositions to an animal. For example, FIG. 22 is a kit 2260 for cleaning the tongue of an animal, according to an embodiment of the present disclosure. The kit 2260 may include an oral care composition 2262 and a tongue cleaning device 2200 packaged together in a packaging 2264. The oral care composition 2262 may be provided in a bottle 2266 with a pump mechanism 2268. In another embodiment, the oral care composition 2262 may be provided in a pressurized can or other dispensing container. As can be appreciated, the oral care composition 2262 may also be provided in any type of container that may be used to contain foam, liquid, liquid spray, gel, or paste. A similar kit may be made using a delivery device and an oral care composition.

Figure 23:
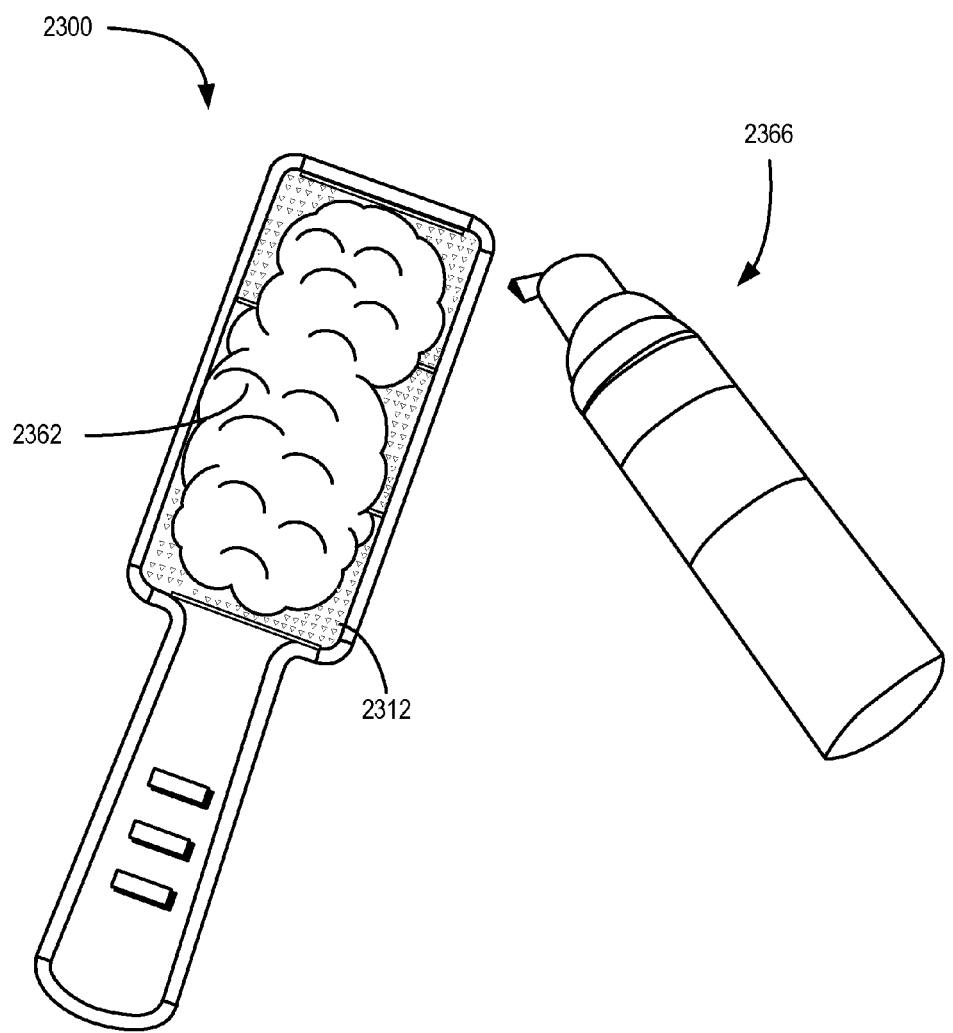
FIG. 23 is a perspective view of an incentivizing agent deposited on a tongue cleaning device, according to one embodiment of the present disclosure.

FIG. 23 is a perspective view of a tongue cleaning device 2300 with an oral care composition deposited on a cleaning surface 2312 of the tongue cleaning device 2300, according to an embodiment of the present disclosure. As depicted in the illustrated embodiment, the oral care composition 2362 may be provided in a bottle 2366 and may be deposited on the cleaning surface 2312 of the tongue cleaning device 2300 prior to being presented to the animal. As can be appreciated, the oral care composition 2362 may be provided in other dispensing devices and/or mechanisms, including but not limited to a sprayer, a pouch, a tube, a vile, and a refrigeration bottle.

Figure 24:
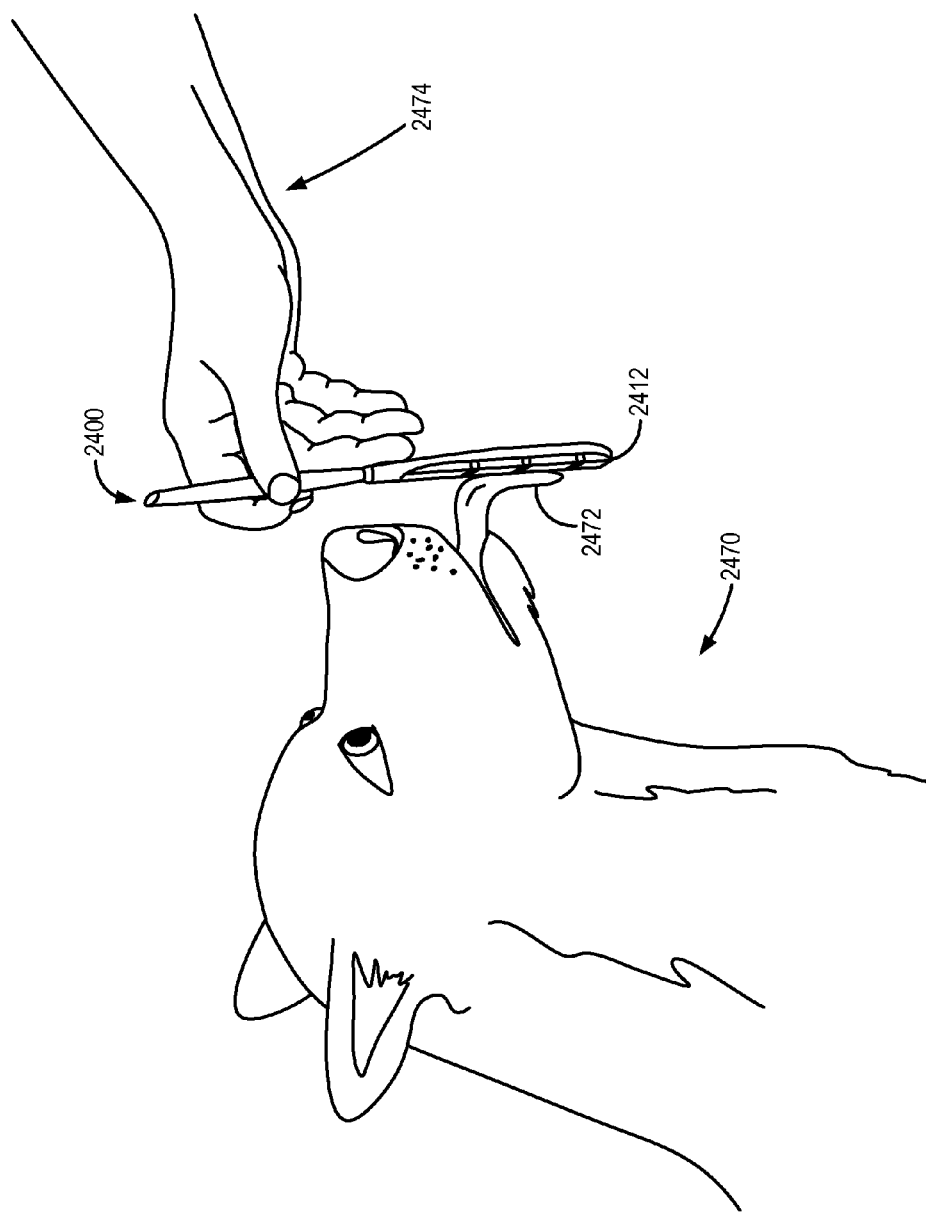
FIG. 24 is a perspective view of a dog licking the tongue cleaning device, according to one embodiment of the present disclosure.

FIG. 24 is a perspective view of a dog 2470 licking the cleaning surface 2412 of the tongue cleaning device 2400, according to one embodiment of the present disclosure. As depicted in the illustrated embodiment, a user 2474 may present the tongue cleaning device 2400 to an animal such as a dog 2470. The dog 2470 may then lick the cleaning surface 2412 of the tongue cleaning device 2400 with its tongue 2472. The licking action of the tongue 2472 of the dog 2470 on the cleaning surface 2412 causes the cleaning surface 2412 to clean the surface of the dog's tongue 2472.

When the animal licks the oral care composition from the oral care device, which may be held by an owner of the animal (e.g., pet/owner relationship), the provision of the oral care may be a pleasant experience for both the animal and the owner. The event may help to bond the animal to the owner and vice versa.

In some embodiments of the disclosure, the cleaning and/or delivery device may be made by injection molding. The first step is to obtain or create a suitable mold. The mold can be formed of machined metal such as aluminum or steel to have an interior cavity reflecting the shape of the cleaning and/or delivery device to be produced. The mold is then used in an injection molding machine which forces molten raw material, such as plastic, into the mold cavity to form the cleaning and/or delivery device. The injection molding process may be a single step or series of steps, depending on the number of materials used. Possible materials for making the invention and components thereof include: polypropylene, polyethylene, polystyrene, thermo plastic rubber, resin, silicon rubber, natural rubber, plastic and other materials.

In one embodiment, the cleaning and/or delivery device may be formed by a one-step injection molding process wherein a single material, such as polypropylene, is used to form the entire cleaning and/or delivery device, such that a single mold is used to form all portions of the cleaning and/or delivery device in a single step. The mold would yield the entire cleaning and/or delivery device of unitary construction upon being opened. An alternative embodiment is to use two or more molds wherein plastics, for example, of differing degrees of rigidity would be molded separately to form distinct components of a cleaning and/or delivery device. These separately molded portions can be fitted together via a mechanical grip, by adhesive such as glue or epoxy, by welding, or by affinity or chemical bond. One embodiment of a multiple step injection molding process is to have three molds, wherein the first mold forms the elongated member, the second mold forms the cleaning surface, including bristles and tongue scrapers, and a third mold forms finger grips. In another embodiment, the molding process may include a fourth mold, wherein the fourth mold forms the depressor.

Without further elaboration, it is believed that one skilled in the art can use the preceding description to utilize the invention to its fullest extent. The examples and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended examples. The scope of the invention is therefore defined by the following claims and their equivalents.

What is claimed is:

1. A dog tongue cleaner that is configured to be presented in front of a dog to allow the dog to lick a dog tongue cleaning surface of the dog tongue cleaner, comprising:
a handle at a proximal end of the dog tongue cleaner; and
a head at a distal end of the dog tongue cleaner and coupled to the handle, the head forming a dog tongue cleaning surface having a length of at least two inches, the dog tongue cleaning surface including at least twenty rows and at least ten columns of bristles and at least one dog tongue scraper that extends along at least ten columns of the bristles across a width of the dog tongue cleaning surface, wherein at least some of the bristles comprise a cylindrical protrusion having a rounded portion and a plurality of elongated members that extend upwardly from the rounded portion.

2. The dog tongue cleaner of claim 1, wherein the handle is curved away from the dog tongue cleaning surface to facilitate presentation of the dog tongue cleaning surface in front of a dog.

3. The dog tongue cleaner of claim 1, wherein each of the bristles comprises a single-pointed b) The dog tongue cleaner of claim 1, wherein the width of the dog tongue cleaning surface is at least two inches.

4. The dog tongue cleaner of claim 1, wherein each of the bristles comprises a single-pointed bristle.

5. The dog tongue cleaner of claim 1, wherein the dog tongue cleaning surface includes at least forty rows and at least twenty columns of bristles.

6. The dog tongue cleaner of claim 1, wherein at least one of the at least one dog tongue scraper extends along at least twenty columns of bristles.

7. The dog tongue cleaner of claim 1, wherein each of the bristles comprises a single-pointed b) The dog tongue cleaner of claim 1, wherein the length of the dog tongue cleaning surface is at least three inches.

8. The dog tongue cleaner of claim 1, wherein each of the bristles comprises a single-pointed b) The dog tongue cleaner of claim 1, wherein the length of the dog tongue cleaning surface is approximately four inches.

9. The dog tongue cleaner of claim 1, further comprising:
an oral care composition that is applied to the dog tongue cleaning surface to entice a dog to lick the dog tongue cleaning surface.

10. The dog tongue cleaner of claim 9, wherein the oral care composition includes one or more dietary or nutritional supplements for ingestion by the dog.

11. The dog tongue cleaner of claim 1, wherein the handle includes a reservoir configured to contain an oral care composition, and the dog tongue cleaning surface includes one or more apertures that are in fluid communication with the reservoir to enable dispensing the oral care composition on the dog tongue cleaning surface.

12. The dog tongue cleaner of claim 1, wherein each of the bristles emanates from a bristle base.

13. The dog tongue cleaner of claim 12, wherein each of the bristles and the bristle base is formed of the same material.

14. The dog tongue cleaner of claim 12, wherein each of the at least one dog tongue scraper emanates from the bristle base.

15. A dog tongue cleaner that is configured to be presented in front of a dog to allow the dog to lick a dog tongue cleaning surface of the dog tongue cleaner, comprising:
a handle at a proximal end of the dog tongue cleaner; and a head at a distal end of the dog tongue cleaner and coupled to the handle, the head forming a dog tongue cleaning surface having a length of at least three inches;

wherein the dog tongue cleaning surface includes at least forty rows and at least twenty columns of bristles, a distal-most row being at a distal edge of the head and a proximal-most row being at a proximal edge of the head such that the distal-most row and the proximal-most row are spaced by at least three inches, and wherein at least some of the bristles comprise a cylindrical protrusion having a rounded portion and a plurality of elongated members that extend upwardly from the rounded portion;

wherein the dog tongue cleaning surface also includes at least one dog tongue scraper that extends across a width of the dog tongue cleaning surface, at least one of the at least one dog tongue scraper extending between two rows of the bristles and along at least twenty columns of the bristles.

16. The dog tongue cleaner of claim 15, wherein the at least one dog tongue scraper includes a first dog tongue scraper that extends between two rows of the bristles and along at least twenty columns of the bristles, and a second dog tongue scraper that extends along fewer columns than the first dog tongue scraper.

17. The dog tongue cleaner of claim 16, wherein the second dog tongue scraper is distal to any rows of the bristles.

18. A dog tongue cleaner that is configured to be presented in front of a dog to allow the dog to lick a dog tongue cleaning surface of the dog tongue cleaner, comprising:

a handle at a proximal end of the dog tongue cleaner; and a head at a distal end of the dog tongue cleaner and coupled to the handle, the head forming a dog tongue cleaning surface having a length of at least three inches;

wherein the dog tongue cleaning surface includes at least twenty rows and at least ten columns of bristles, a distal-most row being at a distal edge of the head and a proximal-most row being at a proximal edge of the head such that the distal-most row and the proximal-most row are spaced by at least three inches, wherein at least some of the bristles comprise a cylindrical protrusion having a rounded portion and a plurality of elongated members that extend upwardly from the rounded portion;

wherein the dog tongue cleaning surface also includes at least one dog tongue scraper that extends across a width of the dog tongue cleaning surface, at least one of the at least one dog tongue scraper extending between two rows of the bristles and along at least ten columns of the bristles.

\* \* \* \* \*